US012121870B2

(12) United States Patent
Liu et al.

(10) Patent No.: US 12,121,870 B2
(45) Date of Patent: Oct. 22, 2024

(54) MULTIFUNCTIONAL $C_4F_7N/CO_2$ MIXED GAS PREPARATION SYSTEM AND PREPARATION METHOD

(71) Applicants: STATE GRID ANHUI ELECTRIC POWER RESEARCH INSTITUTE, Anhui (CN); State Grid Corporation of China, Beijing (CN)

(72) Inventors: Wei Liu, Anhui (CN); Liufang Wang, Anhui (CN); Jiong Qi, Anhui (CN); Yue Zhao, Anhui (CN); Fengxiang Ma, Anhui (CN); Zien Liu, Anhui (CN)

(73) Assignees: STATE GRID ANHUI ELECTRIC POWER RESEARCH INSTITUTE, Hefei (CN); State Grid Corporation of China, Beijing (CN)

( * ) Notice: Subject to any disclaimer, the term of this patent is extended or adjusted under 35 U.S.C. 154(b) by 976 days.

(21) Appl. No.: 17/059,457

(22) PCT Filed: Jul. 30, 2020

(86) PCT No.: PCT/CN2020/105713
§ 371 (c)(1),
(2) Date: Nov. 29, 2020

(87) PCT Pub. No.: WO2021/023086
PCT Pub. Date: Feb. 11, 2021

(65) Prior Publication Data

US 2021/0237005 A1 Aug. 5, 2021

(30) Foreign Application Priority Data

Aug. 7, 2019 (CN) ........................ 201910726123.6

(51) Int. Cl.
*B01F 23/10* (2022.01)
*B01F 23/70* (2022.01)
*B01F 101/23* (2022.01)

(52) U.S. Cl.
CPC .............. *B01F 23/19* (2022.01); *B01F 23/12* (2022.01); *B01F 23/711* (2022.01); *B01F 2101/23* (2022.01)

(58) Field of Classification Search
CPC .......... B01F 23/10; B01F 23/12; B01F 23/19; B01F 23/14
See application file for complete search history.

(56) References Cited

U.S. PATENT DOCUMENTS 3,762,428 A * 10/1973 Beck ....................... B01F 23/19 137/88
3,948,281 A * 4/1976 Strain ..................... F17C 5/002 137/93

(Continued)

FOREIGN PATENT DOCUMENTS

CN 102588740 A * 7/2012
CN 104132237 A 11/2014

(Continued)

OTHER PUBLICATIONS

English translation of CN 104132237A, Cheng et al., obtained on Oct. 4, 2023 from <<https://worldwide.espacenet.com/> (Year: 2023).*

(Continued)

*Primary Examiner* — Marc C Howell
*Assistant Examiner* — Patrick M McCarty

(57) ABSTRACT

A multifunctional $C_4F_7N/CO_2$ mixed gas preparation system is disclosed. The $C_4F_7N$ heat exchanger is used to heat and vaporize $C_4F_7N$ input through the $C_4F_7N$ input port; the $CO_2$ heat exchanger is used to heat and vaporize $CO_2$ input through the $CO_2$ input port; the $C_4F_7N/CO_2$ mixing pipeline structure is used to mix the heated $C_4F_7N$ and heated $CO_2$, (Continued)

and the $C_4F_7N/CO_2$ mixed gas output pipeline structure is used to output the $C_4F_7N/CO_2$ mixed gas. The $C_4F_7N/CO_2$ mixing pipeline structure comprises a $C_4F_7N/CO_2$ dynamic gas preparation pipeline structure and a $C_4F_7N/CO_2$ partial pressure mixing pipeline structure; the $C_4F_7N/CO_2$ partial pressure mixing pipeline structure includes partial pressure mixing tanks for mixing the $CO_2$ and the heated $C_4F_7N$ of certain pressures; and a plurality of partial pressure mixing tanks are arranged in parallel. A multifunctional $C_4F_7N/CO_2$ mixed gas preparation method is also disclosed.

12 Claims, 6 Drawing Sheets

(56) References Cited

U.S. PATENT DOCUMENTS

| | | | | | |
|---|---|---|---|---|---|
| 5,470,390 | A | * | 11/1995 | Nishikawa | B01F 23/19<br>118/715 |
| 6,105,631 | A | * | 8/2000 | Pittroff | B01F 23/19<br>141/3 |
| 7,740,031 | B2 | * | 6/2010 | Egan | B01F 23/19<br>141/105 |
| 2010/0087776 | A1 | * | 4/2010 | Warren | B01F 25/431971<br>141/2 |
| 2018/0071694 | A1 | * | 3/2018 | Denner | B01D 1/0082 |
| 2019/0085802 | A1 | * | 3/2019 | St. Mary | F02M 37/0064 |

FOREIGN PATENT DOCUMENTS

| | | | | | |
|---|---|---|---|---|---|
| CN | 204099896 | U | | 1/2015 | |
| CN | 204582983 | U | | 8/2015 | |
| CN | 206112505 | U | * | 4/2017 | |
| CN | 107583477 | A | | 1/2018 | |
| CN | 107747678 | A | * | 3/2018 | F17C 13/025 |
| CN | 108514846 | A | | 9/2018 | |
| CN | 108730761 | A | * | 11/2018 | |
| CN | 109237304 | A | | 1/2019 | |
| CN | 208418153 | U | | 1/2019 | |
| CN | 109316987 | A | | 2/2019 | |
| CN | 109404728 | A | * | 3/2019 | F17C 13/00 |
| CN | 208634790 | U | | 3/2019 | |
| CN | 208742448 | U | | 4/2019 | |
| CN | 109737305 | A | | 5/2019 | |
| CN | 210993805 | U | | 7/2020 | |
| DE | 1934109 | A1 | * | 1/1971 | |
| TW | 201142056 | A | * | 12/2011 | B01F 3/028 |

OTHER PUBLICATIONS

English translation of CN 204582983U, Chen et al., obtained on Oct. 4, 2023 from <<https://worldwide.espacenet.com/> (Year: 2023).*

English translation of CN108514846A, Lyu, obtained on Oct. 6, 2023 from <<https://worldwide.espacenet.com/> (Year: 2023).*

Xiao, A., Owens, J. G., Bonk, J., Zhang, A., Wang, C., & Tu, Y. (Apr. 2019). Environmentally friendly insulating gases as SF 6 alternatives for power utilities. In 2019 2nd International Conference on Electrical Materials and Power Equipment (ICEMPE) (pp. 42-48). IEEE. (Year: 2019).*

* cited by examiner

MULTIFUNCTIONAL $C_4F_7N/CO_2$ MIXED GAS PREPARATION SYSTEM AND PREPARATION METHOD

FIELD

The disclosure relates to the field of electrical technology, in particular to the technical field of preparation for mixed insulating medium.

BACKGROUND

As an irreplaceable key power transmission and transformation equipment in modern power grids, the gas-insulated equipment has the advantages of compact structure, being less affected from environmental factors, and high operational safety and reliability. $SF_6$ gas is currently the most widely used insulating medium in the power industry due to its excellent insulation and arc extinguishing performance.

However, $SF_6$ gas has a strong greenhouse effect. In the "Kyoto Protocol" signed in 1997, $SF_6$, $CO_2$, $CH_4$, $N_2O$, PFC, and HFC are clearly listed as greenhouse gases that are restricted for emission. At this stage, there is still a huge demand for equipment using $SF_6$ as insulation and arc extinguishing medium. In middle-high voltage field, the annual output of related equipment is still increasing by a double-digit percentage. To completely eliminate the impact of $SF_6$ gas on the environment, the most effective way is to develop and use environment-friendly gas or its mixed gas to replace $SF_6$.

Pipeline power transmission is an important way to solve the transmission bottleneck in special geographical environment. $SF_6$ gas-insulated transmission pipelines (GIL) with a cumulative length of hundreds of kilometers have been laid in the world, with voltage levels covering 72 kV~1200 kV. GIL uses a large amount of gas, and there is an urgent need to develop environmentally friendly transmission pipelines that do not contain $SF_6$ gas. The 3M company has developed an environmentally friendly insulating gas $C_4F_7N$ that does not contain $SF_6$, and the GE company and ABB company have applied it to 420 kV GIL switchgear. The insulation performance of $C_4F_7N$ is more than 2.2 times that of $SF_6$ gas, and the greenhouse effect coefficient is only one-tenth of that of $SF_6$ gas. While it is considered to be the most promising new insulating medium, the liquefaction temperature of $C_4F_7N$ is relatively high (approximately −4.7° C. under one atmosphere), and it needs to be mixed with a certain proportion of buffer gas (such as $CO_2$) when used.

Gas mixing ratio is a very important parameter for mixed insulating gas equipment. If the ratio is greater than the rated value, the mixed gas may liquefy under certain conditions; if the ratio is less than the rated value, the insulation strength of the mixed gas will be insufficient. At present, the national key research and development special plan "Environmental protection pipeline transmission key technology" has been jointly tackled by more than a dozen domestic top scientific research institutions, researching the scientific and technological issues in the application of the new mixed insulating gas $C_4F_7N/CO_2$ in UHV GIL. The accurate preparation of $C_4F_7N/CO_2$ mixed gas is a technical problem that must be solved before the scientific research and engineering application of $C_4F_7N/CO_2$ mixed gas. On one hand, scientific research institutions need to accurately prepare a tiny amount of $C_4F_7N/CO_2$ mixed gas for laboratory research; on the other hand, equipment manufacturers develop 1000 kV GIL, which has a large gas chamber volume and needs to use a large amount of $C_4F_7N/CO_2$ mixed gas.

There are mainly two existing mixed gas preparation technologies. One is the dynamic gas preparation and inflation method, that is, the two gases are mixed first, and then the equipment is inflated. For example, Chinese patent application No. 2017109526872 discloses an eight-channel dynamic gas preparation method and system for sulfur hexafluoride. The method uses mass flow meters to control the flows of two gases, with high preparation accuracy and simple operation. However, the $C_4F_7N$ vaporization speed is too slow, which limits the $C_4F_7N/CO_2$ mixed gas preparation speed, and a large amount of mixed gas cannot be prepared quickly. Another method is partial pressure gas preparation using Dalton's law of partial pressure. First, the equipment is filled with $C_4F_7N$ gas of a certain partial pressure, and then with $CO_2$ gas of a certain partial pressure. In actual operation, the degree of automation is low and the gas preparation accuracy is poor, and it takes at least 24 hours for the two gases to be uniformly mixed in the equipment, which seriously affects the on-site construction period.

SUMMARY

The disclosure aims to solve the technical problem that the $C_4F_7N$ vaporization speed is too slow, which limits the preparation speed of the $C_4F_7N/CO_2$ mixed gas and a large amount of mixed gas cannot be prepared quickly.

The present disclosure solves the above technical problems through the following technical means.

A multifunctional $C_4F_7N/CO_2$ mixed gas preparation system, including a $C_4F_7N$ input port, a $CO_2$ input port, a $C_4F_7N$ heat exchanger, a $CO_2$ heat exchanger, a $C_4F_7N/CO_2$ mixing pipeline structure, and a $C_4F_7N/CO_2$ mixed gas output pipeline structure;

- the $C_4F_7N$ heat exchanger is used to heat and vaporize $C_4F_7N$ input through the $C_4F_7N$ input port; the $CO_2$ heat exchanger is used to heat and vaporize $CO_2$ input through the $CO_2$ input port; the $C_4F_7N/CO_2$ mixing pipeline structure is used to mix the vaporized $C_4F_7N$ and $CO_2$, and the $C_4F_7N/CO_2$ mixed gas output pipeline structure is used to output the $C_4F_7N/CO_2$ mixed gas;
- the $C_4F_7N/CO_2$ mixing pipeline structure includes a $C_4F_7N/CO_2$ dynamic gas preparation pipeline structure and a $C_4F_7N/CO_2$ partial pressure mixing pipeline structure;
- the $C_4F_7N/CO_2$ dynamic gas preparation pipeline structure and the $C_4F_7N/CO_2$ partial pressure mixing pipeline structure are arranged in parallel; the $C_4F_7N/CO_2$ dynamic gas preparation pipeline structure is used to quantitatively mix the vaporized $CO_2$ and $C_4F_7N$; and the $C_4F_7N/CO_2$ partial pressure mixing pipeline structure is used to mix the vaporized $CO_2$ and $C_4F_7N$ at certain pressures;
- the $C_4F_7N/CO_2$ partial pressure mixing pipeline structure includes partial pressure mixing tanks for mixing the $CO_2$ and $C_4F_7N$ of certain pressures; and a plurality of partial pressure mixing tanks are arranged in parallel.

The present disclosure first perform vacuum treatment to the gas preparation system; $C_4F_7N$ input through the $C_4F_7N$ input port is heated and vaporized through the $C_4F_7N$ heat exchanger; $CO_2$ input through the $CO_2$ input port is heated and vaporized through the $CO_2$ heat exchanger; the vaporized $C_4F_7N$ and $CO_2$ are mixed in the $C_4F_7N/CO_2$ mixing pipeline structure; the vaporized $C_4F_7N$ and $CO_2$ are quantitatively mixed in the $C_4F_7N/CO_2$ dynamic mixing pipeline structure; the vaporized $C_4F_7N$ and $CO_2$ are mixed at certain pressures through the $C_4F_7N/CO_2$ partial pressure mixing pipeline structure; a plurality of the partial pressure mixing tanks are arranged in parallel and alternately perform gas preparation and output; and the $C_4F_7N/CO_2$ mixed gas is output through the $C_4F_7N/CO_2$ mixed gas output pipeline structure.

In the present disclosure, a $C_4F_7N$ heat exchanger is installed at the $C_4F_7N$ input port, and a $CO_2$ heat exchanger is installed at the $CO_2$ input port, so that the $C_4F_7N$ and $CO_2$ input are heated and vaporized respectively to ensure that the $C_4F_7N$ and $CO_2$ input to the subsequent pipelines are always in a stable gaseous state. In this way, the technical problems that the $C_4F_7N$ vaporization speed is too slow and limit the $C_4F_7N/CO_2$ mixed gas preparation speed, and that a large amount of mixed gas cannot be quickly prepared are effectively solved. By performing heat exchange and vaporization to $C_4F_7N$ and $CO_2$ at the input source, the stability of the state of the gas source input to the system is significantly ensured, and the gas preparation rate is improved.

Since the $C_4F_7N/CO_2$ mixing pipeline structure of the present disclosure includes the $C_4F_7N/CO_2$ dynamic gas preparation pipeline structure and the $C_4F_7N/CO_2$ partial pressure mixing pipeline structure, it can realize two gas preparation modes: quantitative flow gas preparation and partial pressure gas preparation, realizing the versatility of the gas preparation of the present disclosure. According to different gas preparation purposes, different gas preparation pipeline structures can be switched: it can not only adopt the manner of quantitative flow gas preparation to meet the requirements of a tiny amount of $C_4F_7N/CO_2$ mixed gas in the laboratory, but can also adopt the manner of partial pressure preparation to quickly prepare a large amount of $C_4F_7N/CO_2$ mixed gas of different pressures. In addition, because the $C_4F_7N$ heat exchanger is installed at the $C_4F_7N$ input port and the $CO_2$ heat exchanger is installed at the $CO_2$ input port in the present disclosure, the $CO_2$ and $C_4F_7N$ input to the system are pre-vaporized, so that the quantitative flow gas preparation of the present disclosure also has application prospects for a large amount of $C_4F_7N/CO_2$ mixed gas.

In the present disclosure, the two gas preparation pipeline structures of the $C_4F_7N/CO_2$ dynamic gas preparation pipeline structure 51 and the $C_4F_7N/CO_2$ partial pressure mixing pipeline structure 52 are integrated into an overall pipeline structure, so that the gas preparation system of the present disclosure has a high equipment integration rate, and can effectively reduce the cost of the system, simplify the complexity of the control and improve the flexibility of preparation.

Preferably, the $C_4F_7N/CO_2$ dynamic gas preparation pipeline structure includes a first solenoid valve, a second solenoid valve, a first thermal mass flow meter, a second thermal mass flow meter, a buffer mixing tank, a first pipe, and a second pipe;

the buffer mixing tank is provided with a first gas inlet, a second gas inlet, and a first mixed gas outlet; and the gas outlet of the $CO_2$ heat exchanger is communicated with the first gas inlet through the first pipe, and the first solenoid valve and the first thermal mass flow meter are both arranged on the first pipe; the gas outlet of the $C_4F_7N$ heat exchanger is communicated with the second gas inlet through the second pipe, and the second solenoid valve and the second thermal mass flow meter are both arranged on the second pipe; and the first mixed gas outlet is communicated with the inlet end of the $C_4F_7N/CO_2$ mixed gas output pipeline structure.

Preferably, the $C_4F_7N/CO_2$ partial pressure mixing pipeline structure further includes a third pipe, a fourth pipe, a fifth pipe, a third solenoid valve, a fourth solenoid valve, and a first proportional valve; the gas inlet of the third pipe is communicated with the $CO_2$ input port, the gas inlet of the fourth pipe is communicated with the $C_4F_7N$ input port, and the gas outlet of the third pipe and the gas outlet of the fourth pipe are both communicated with the gas inlet of the fifth pipe; the gas outlet of the fifth pipe is communicated with the gas inlets of the partial pressure mixing tanks; the third solenoid valve is arranged on the third pipe, the fourth solenoid valve is arranged on the fourth pipe, and the first proportional valve is arranged on the fifth pipe.

Preferably, the partial pressure mixing tank is further provided with a circulating mixing pipeline structure. The circulating mixing pipeline structure includes a fifth solenoid valve, a first air pump, a first one-way valve, a sixth solenoid valve, and a circulating pipe; the two ends of the partial pressure mixing tank are respectively provided with a circulating gas inlet and a circulating gas outlet; the two ends of the circulating pipe are respectively communicated with the circulating gas inlet and the circulating gas outlet; and the fifth solenoid valve, the first air pump, the first one-way valve and the sixth solenoid valve are sequentially arranged on the circulating pipe in the order in which the gas flows from the circulating gas outlet to the circulating gas inlet.

Preferably, the number of the partial pressure mixing tanks is two, namely the first partial pressure mixing tank and the second partial pressure mixing tank;

the circulating pipe includes a circulating gas inlet section, a circulating section, and a circulating gas outlet section that are communicated with each other end to end sequentially; the gas inlet of the circulating gas inlet section is communicated with the circulating gas outlet of the corresponding partial pressure mixing tank; the fifth solenoid valve is arranged on the corresponding circulating gas inlet section, and the gas outlets of the two circulating gas inlet sections are both communicated with the gas inlet of one circulating section; and the first air pump and the first one-way valve are all provided on the circulating section; the gas outlet of the circulating section is communicated with the gas inlets of the two circulating gas outlet sections; the sixth solenoid valve is provided on the corresponding circulating gas outlet section, and the gas outlet of the circulating gas outlet section is communicated with the circulating gas inlet of the corresponding partial pressure mixing tank.

At the same time, the $C_4F_7N/CO_2$ partial pressure mixing pipeline structure of the present disclosure includes a plurality of partial pressure mixing tanks, and the partial pressure mixing tanks are divided into two groups, so that when one group is in gas preparation, the other group is in the state of outputting mixed gas. Thus, the system is always in a state that the gas preparation and outputting of mixed gas are performed simultaneously, which saves gas preparation time and further improves gas preparation efficiency.

Preferably, the $C_4F_7N/CO_2$ mixing pipeline structure further includes an output pipeline structure for extracting the $C_4F_7N/CO_2$ mixed gas in the partial pressure mixing tank;

the output pipeline structure includes a seventh solenoid valve, a Fujiwara oil-free vacuum pump or a negative pressure pump, a second one-way valve, a second proportional valve, an eighth solenoid valve, a first output pipe, and a second output pipe;

the first output pipe and the second output pipe are arranged in parallel, the gas inlet of the first output pipe and the gas inlet of the second output pipe are both communicated with the gas outlet of the partial pressure mixing tank, and the gas outlet of the first output pipe and the gas outlet of the second output pipe are both communicated with the $C_4F_7N/CO_2$ mixed gas output pipeline structure;

the seventh solenoid valve, the Fujiwara oil-free vacuum pump or the negative pressure pump, and the second one-way valve are sequentially arranged on the first output pipe along the gas conveying direction; and the second proportional valve and the eighth solenoid valve are sequentially arranged on the second output pipe along the gas flow direction.

In order to fully output the $C_4F_7N/CO_2$ mixed gas output from the partial pressure mixing tank, the present disclosure is equipped in the $C_4F_7N/CO_2$ mixing pipeline structure with the output pipeline structure for extracting the $C_4F_7N/CO_2$ mixed gas in the partial pressure mixing tank.

Preferably, the multifunctional $C_4F_7N/CO_2$ mixed gas preparation system further includes a pressurizing pipeline structure, which is used to pressurize the $C_4F_7N/CO_2$ mixed gas output from the $C_4F_7N/CO_2$ mixing pipeline structure.

Preferably, the $C_4F_7N/CO_2$ mixed gas output pipeline structure includes a ninth solenoid valve, a second buffer tank, and a mixed gas outlet pipe; the gas inlet of the mixed gas outlet pipe is communicated with the outlet end of the pressurizing pipeline structure; and the ninth solenoid valve and the second buffer tank are sequentially arranged on the mixed gas outlet pipe along the gas flow.

A $C_4F_7N/CO_2$ mixed gas preparation method using the above multifunctional $C_4F_7N/CO_2$ mixed gas preparation system to perform $C_4F_7N/CO_2$ mixed gas preparation is further disclosed. The method includes the following steps:

S1, performing vacuum treatment to the gas preparation system;

S2, heating and vaporizing the $C_4F_7N$ input through the $C_4F_7N$ input port by the $C_4F_7N$ heat exchanger; and heating and vaporizing the $CO_2$ input through the $CO_2$ input port by the $CO_2$ heat exchanger;

S3, mixing the vaporized $C_4F_7N$ and $CO_2$ in the $C_4F_7N/CO_2$ mixing pipeline structure;

the vaporized $C_4F_7N$ and $CO_2$ are quantitatively mixed in the $C_4F_7N/CO_2$ dynamic mixing pipeline structure; the vaporized $C_4F_7N$ and $CO_2$ are mixed at certain pressures through the $C_4F_7N/CO_2$ partial pressure mixing pipeline structure; a plurality of the partial pressure mixing tanks are arranged in parallel and alternately perform gas preparation and output; and

S4, outputting the $C_4F_7N/CO_2$ mixed gas through the $C_4F_7N/CO_2$ mixed gas output pipeline structure.

Advantages of the Present Disclosure (1) In the present disclosure, a $C_4F_7N$ heat exchanger is installed at the $C_4F_7N$ input port, and a $CO_2$ heat exchanger is installed at the $CO_2$ input port, so that the $C_4F_7N$ and $CO_2$ input are heated and vaporized respectively to ensure that the $C_4F_7N$ and $CO_2$ input to the subsequent pipelines are always in a stable gaseous state. In this way, the technical problems that the $C_4F_7N$ vaporization speed is too slow and limit the $C_4F_7N/CO_2$ mixed gas preparation speed, and that a large amount of mixed gas cannot be quickly prepared are effectively solved. By performing heat exchange and vaporization treatment to $C_4F_7N$ and $CO_2$ at the input source, the stability of the state of the gas source input to the system is significantly ensured, and the gas preparation rate is improved.

(2) Since the $C_4F_7N/CO_2$ mixing pipeline structure of the present disclosure includes the $C_4F_7N/CO_2$ dynamic gas preparation pipeline structure and the $C_4F_7N/CO_2$ partial pressure mixing pipeline structure, it can realize two gas preparation modes: quantitative flow gas preparation and partial pressure gas preparation, realizing the versatility of the gas preparation of the present disclosure. According to different gas preparation purposes, different gas preparation pipeline structures can be switched: it can not only adopt the manner of quantitative flow gas preparation to meet the requirements of a tiny amount of $C_4F_7N/CO_2$ mixed gas in the laboratory, but can also adopt the manner of partial pressure preparation to quickly prepare a large amount of $C_4F_7N/CO_2$ mixed gas of different pressures. In addition, because the $C_4F_7N$ heat exchanger is installed at the $C_4F_7N$ input port and the $CO_2$ heat exchanger is installed at the $CO_2$ input port in the present disclosure, the $CO_2$ and $C_4F_7N$ input to the system are pre-vaporized, so that the quantitative flow gas preparation of the present disclosure also has application prospects for a large amount of $C_4F_7N/CO_2$ mixed gas.

(3) In the present disclosure, the two gas preparation pipeline structures of the $C_4F_7N/CO_2$ dynamic gas preparation pipeline structure and the $C_4F_7N/CO_2$ partial pressure mixing pipeline structure are integrated into an overall pipeline structure, so that the gas preparation system of the present disclosure has a high equipment integration rate, and can effectively reduce the cost of the system, simplify the complexity of the control and improve the flexibility of preparation.

(4) In addition, the $C_4F_7N/CO_2$ dynamic gas preparation pipeline structure of the present disclosure can also meet the needs of gas supplementation, supplementing gas for leaking equipment, and accurately correcting the ratio of mixed gas in the equipment.

Furthermore, by installing the first thermal mass flow meter on the first pipe and the second thermal mass flow meter on the second pipe, the flow of $CO_2$ into the first pipe and the flow of $C_4F_7N$ into the second pipe are controlled in real time; in combination of the adjustment of the opening of the first solenoid valve and the opening of the second solenoid valve respectively, the flow of $C_4F_7N$ and the flow of $CO_2$ into the buffer mixing tank are ensured to be within the set value range, so as to further ensure that the ratio of the $C_4F_7N/CO_2$ is always within a constant range and to ensure accurate gas preparation.

Furthermore, the $C_4F_7N/CO_2$ partial pressure mixing pipeline structure of the present disclosure includes a plurality of partial pressure mixing tanks, and the partial pressure mixing tanks are divided into two groups, so that when one group is in gas preparation, the other group is in the state of outputting mixed gas. Thus, the system is always in a state that the gas preparation and outputting of mixed gas are performed simultaneously, which saves gas preparation time and further improves gas preparation efficiency.

Furthermore, compared with the prior art, which only relies on the free movement of gas molecules to achieve gas mixing, the present disclosure provides a circulating mixing pipeline structure to allow the $C_4F_7N$ and $CO_2$ to be mixed in a flowing state, which can further improve the mixing efficiency of $C_4F_7N$ and $CO_2$ and will ultimately improve the gas preparation efficiency.

Furthermore, the present disclosure only adopts one circulating section, by which the mixing of the gas in the two partial pressure mixing tanks can be realized, thereby simplifying the pipeline design and improving the integration effect of the pipelines.

Furthermore, by providing the fourth proportional valve, the flows of $C_4F_7N$ and $CO_2$ input into the circulating pipe can be adjusted. Thereby, the amount of $C_4F_7N$ and $CO_2$ to be mixed per unit time can be controlled according to the specific gas preparation requirements and the gas preparation environment, and the flexibility of mixing is improved.

Furthermore, by providing to weight sensors at the bottom of the partial pressure mixing tanks to monitor online the weight of the gas z in the partial pressure mixing tank, in combination of the online monitoring of the differential pressure sensor to achieve mutual feedback of quality value and pressure value, it is possible to monitor the accuracy of $C_4F_7N$ and $CO_2$ gas preparation more accurately.

DETAILED DESCRIPTION

In order to make the objectives, technical solutions, and advantages of the embodiments of the present disclosure clearer, the technical solutions in the embodiments of the present disclosure will be described clearly and completely in conjunction with the embodiments of the present disclosure. Obviously, the described embodiments are part of the embodiments of the present disclosure. Based on the embodiments of the present disclosure, all other embodiments obtained by those of ordinary skill in the art without creative work shall fall within the protection scope of the present disclosure.

It should be noted that when an element is referred to as being "fixed to" another element, it can be directly on the other element or an intermediate element may also be present. When an element is considered to be "connected" to another element, it can be directly connected to the other element or an intermediate element may be present at the same time.

Embodiment 1

Figure 1:
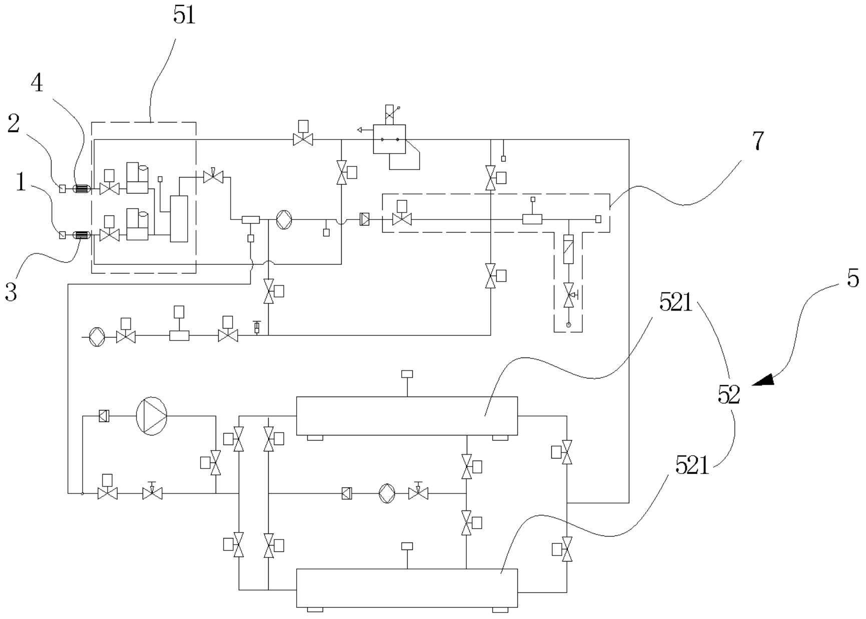
FIG. 1 is a schematic structural diagram of a multifunctional $C_4F_7N/CO_2$ mixed gas preparation system in Embodiment 1 of the present disclosure.

As shown in FIG. 1, a multifunctional $C_4F_7N/CO_2$ mixed gas preparation system is disclosed by the embodiment. The system includes a $C_4F_7N$ input port 1, a $CO_2$ input port 2, a $C_4F_7N$ heat exchanger 3, a $CO_2$ heat exchanger 4, a $C_4F_7N/CO_2$ mixing pipeline structure 5, and a $C_4F_7N/CO_2$ mixed gas output pipeline structure 7.

The $C_4F_7N$ heat exchanger 3 is used to heat and vaporize the $C_4F_7N$ input through the $C_4F_7N$ input port 1. The $CO_2$ heat exchanger 4 is used to heat and vaporize the $CO_2$ input through the $CO_2$ input port 2. The $C_4F_7N/CO_2$ mixing pipeline structure 5 is used to mix the vaporized $C_4F_7N$ and $CO_2$, and the $C_4F_7N/CO_2$ mixed gas output pipeline structure 7 is used to output the $C_4F_7N/CO_2$ mixed gas.

The $C_4F_7N/CO_2$ mixing pipeline structure 5 includes a $C_4F_7N/CO_2$ dynamic gas preparation pipeline structure 51 and a $C_4F_7N/CO_2$ partial pressure mixing pipeline structure 52.

The $C_4F_7N/CO_2$ dynamic gas preparation pipeline structure 51 and the $C_4F_7N/CO_2$ partial pressure mixing pipeline structure 52 are arranged in parallel. The $C_4F_7N/CO_2$ dynamic gas preparation pipeline structure 51 is used to quantitatively mix the vaporized $CO_2$ and $C_4F_7N$. The $C_4F_7N/CO_2$ partial pressure mixing pipeline structure 52 is used to mix the vaporized $CO_2$ and $C_4F_7N$ at certain pressures.

The $C_4F_7N/CO_2$ partial pressure mixing pipeline structure 52 includes a partial pressure mixing tank 521 for mixing $CO_2$ and $C_4F_7N$ of certain pressures. A plurality of partial pressure mixing tanks 521 are arranged in parallel and perform gas preparation and gas transmission alternately.

When the dynamic quantitative flow gas preparation for $C_4F_7N/CO_2$ is required, the various pipes in the $C_4F_7N/CO_2$ partial pressure mixing pipeline structure 52 are closed, and the pipes in the $C_4F_7N/CO_2$ dynamic gas preparation pipeline structure 51 and the pipes in the $C_4F_7N/CO_2$ mixed gas output pipeline structure 7 are opened, so that passages are formed among the $C_4F_7N$ input port 1, the $CO_2$ input port 2, the pipes in the $C_4F_7N/CO_2$ dynamic gas preparation pipeline structure 51 and the pipes in the $C_4F_7N/CO_2$ mixed gas output pipeline structure 7, and the pipelines are vacuumed. After the heat exchange of $C_4F_7N$ through the $C_4F_7N$ heat exchanger 3, the temperature rises to ensure that the $C_4F_7N$ is stable in gaseous state. In the same way, after the heat exchange of $CO_2$ through the heat exchanger 4, the temperature rises. The $C_4F_7N$ and $CO_2$ after heat exchange are input into the $C_4F_7N/CO_2$ dynamic gas preparation pipeline structure 51, and by adjusting the flow of $C_4F_7N$ and $CO_2$, the quantitative mixing of $C_4F_7N$ and $CO_2$ is realized. Finally, the quantitatively mixed $C_4F_7N$ and $CO_2$ are output through the $C_4F_7N/CO_2$ mixed gas output pipeline structure 7 to complete the $C_4F_7N/CO_2$ dynamic quantitative flow gas preparation.

When the partial pressure preparation for $C_4F_7N/CO_2$ is required, the pipes in the $C_4F_7N/CO_2$ dynamic gas preparation pipeline structure 51 are closed, and the various pipes in the $C_4F_7N/CO_2$ partial pressure mixing pipeline structure 52 and the pipes in the $C_4F_7N/CO_2$ mixed gas output pipe structure 7 are opened, so that passages are formed among the $C_4F_7N$ input port 1, the $CO_2$ input port 2, the pipes in the $C_4F_7N/CO_2$ partial pressure mixing pipeline structure 52 and the pipes in the $C_4F_7N/CO_2$ mixed gas output pipeline structure 7, and the pipelines are vacuumed. After the heat exchange of $C_4F_7N$ through the $C_4F_7N$ heat exchanger 3, the temperature rises to ensure that the $C_4F_7N$ is stable in gaseous state. In the same way, after the heat exchange of $CO_2$ through the heat exchanger 4, the temperature rises. The $C_4F_7N$ and $CO_2$ after heat exchange are input into the $C_4F_7N/CO_2$ partial pressure mixing pipeline structure 52, and by adjusting the partial pressure of $C_4F_7N$ and the partial pressure of $CO_2$, the pressure-adjusted $C_4F_7N$ and $CO_2$ are input into each partial pressure mixing tank 521, and mixed in the partial pressure mixing tank 521. In addition, while ensuring that some of the partial pressure mixing tanks 521 are in the mixing state, the other partial pressure mixing tanks 521 are in the state of inputting the $C_4F_7N/CO_2$ mixed gas to the $C_4F_7N/CO_2$ mixed gas output pipeline structure 7. Finally, the $C_4F_7N$ and $CO_2$ of quantitative pressures are output through the $C_4F_7N/CO_2$ mixed gas output pipeline structure 7 to complete the $C_4F_7N/CO_2$ partial pressure preparation.

The advantages of the present disclosure are as follows.

(1) In the present disclosure, a $C_4F_7N$ heat exchanger 3 is installed at the $C_4F_7N$ input port 1, and a $CO_2$ heat exchanger 4 is installed at the $CO_2$ input port 2, so that the $C_4F_7N$ and $CO_2$ input are heated and vaporized respectively to ensure that the $C_4F_7N$ and $CO_2$ input to the subsequent pipelines are always in a stable gaseous state. In this way, the technical problems that the $C_4F_7N$ vaporization speed is too slow and limit the $C_4F_7N/CO_2$ mixed gas preparation speed, and that a large amount of mixed gas cannot be quickly prepared are effectively solved. By heat exchange of $C_4F_7N$ and $CO_2$ at the input source, the stability of the state of the gas source input to the system is significantly ensured, and the gas preparation rate is improved.

(2) Since the $C_4F_7N/CO_2$ mixing pipeline structure 5 of the present disclosure includes the $C_4F_7N/CO_2$ dynamic gas preparation pipeline structure 51 and the $C_4F_7N/CO_2$ partial pressure mixing pipeline structure 52, it can realize two gas preparation modes: quantitative flow gas preparation and partial pressure gas preparation, realizing the versatility of the gas preparation of the present disclosure. According to different gas preparation purposes, different gas preparation pipeline structures can be switched. The present disclosure can not only adopt the method of quantitative flow gas preparation to meet the requirements of a tiny amount of $C_4F_7N/CO_2$ mixed gas in the laboratory, but also adopt the method of partial pressure preparation to quickly prepare a large amount of $C_4F_7N/CO_2$ mixed gas of different pressures and different proportions. In addition, because the $C_4F_7N$ heat exchanger 3 is installed at the $C_4F_7N$ input port 1 and the $CO_2$ heat exchanger 4 is installed at the $CO_2$ input port 2 in the present disclosure, the $CO_2$ and $C_4F_7N$ input to the system are preheated and vaporized, so that the quantitative flow gas preparation of the present disclosure also has application prospects for a large amount of $C_4F_7N/CO_2$ mixed gas.

(3) In the present disclosure, the two gas preparation pipeline structures of the $C_4F_7N/CO_2$ dynamic gas preparation pipeline structure 51 and the $C_4F_7N/CO_2$ partial pressure mixing pipeline structure 52 are integrated into an overall pipeline structure, so that the gas preparation system of the present disclosure has a high equipment integration rate, and can effectively reduce the cost of the system, simplify the complexity of the control and improve the flexibility of preparation.

(4) In addition, the $C_4F_7N/CO_2$ dynamic gas preparation pipeline structure 51 of the present disclosure can also meet the needs of gas supplementation, supplementing gas for leaking equipment, and accurately correcting the ratio of mixed gas in the equipment.

Example 2

Figure 2:
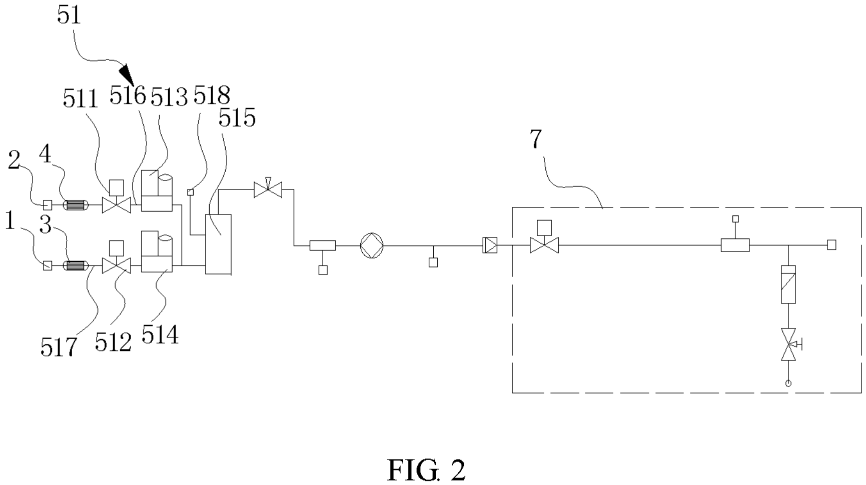
FIG. 2 is a schematic structural diagram of the $C_4F_7N/CO_2$ dynamic gas preparation pipeline structure in Embodiment 2 of the present disclosure.

As shown in FIG. 2, the difference between this embodiment and the foregoing embodiment is that a specific $C_4F_7N/CO_2$ dynamic gas preparation pipeline structure 51 is provided.

The $C_4F_7N/CO_2$ dynamic gas preparation pipeline structure 51 includes a first solenoid valve 511, a second solenoid valve 512, a first thermal mass flow meter 513, a second thermal mass flow meter 514, a buffer mixing tank 515, a first pipe 516, and a second pipe 517.

The buffer mixing tank 515 is provided with a first gas inlet, a second gas inlet, and a first mixed gas outlet.

The gas outlet of the $CO_2$ heat exchanger 4 is communicated with the first gas inlet through the first pipe 516, and the first solenoid valve 511 and the first thermal mass flow meter 513 are both arranged on the first pipe 516. The gas outlet of the $C_4F_7N$ heat exchanger 3 is communicated with the second gas inlet through the second pipe 517, and the second solenoid valve 512 and the second thermal mass flow meter 514 are both arranged on the second pipe 517. The first mixed gas outlet is in communicated with the gas intake end of the $C_4F_7N/CO_2$ mixed gas output pipeline structure 7.

When dynamic quantitative flow preparation for $C_4F_7N/CO_2$ is required, the first solenoid valve 511 and the second solenoid valve 512 are respectively opened to control the flow of the heated $CO_2$ passing through the first pipe 516 per unit time and the flow of the heated $C_4F_7N$ passing through the second pipe 517 per unit time, and the flows of $CO_2$ and $C_4F_7N$ are effectively monitored through the first thermal mass flow meter 513 and the second thermal mass flow meter 514. If the flow is abnormal, that is, the flow is not within the set value range, the corresponding thermal mass flow meter sends an abnormal signal to the control center. After analyzing the signal, the control center sends instructions to drive the corresponding solenoid valve to work, and performs online flow adjustment by adjusting the magnitude of the opening by the solenoid valve. The $CO_2$ and $C_4F_7N$ monitored by the first thermal mass flow meter 513 and the second thermal mass flow meter 514 are mixed in the buffer mixing tank 515, and are output through the $C_4F_7N/CO_2$ mixed gas output pipeline structure 7 after being mixed.

In the present disclosure, by installing the first thermal mass flow meter 513 on the first pipe 516 and the second thermal mass flow meter 514 on the second pipe 517, the flow of $CO_2$ into the first pipe 516 and the flow of $C_4F_7N$ into the second pipe are controlled in real time; in combination of the adjustment of the opening of the first solenoid valve 511 and the opening of the second solenoid valve 512, the flow of $C_4F_7N$ and the flow of $CO_2$ into the buffer mixing tank 515 are ensured to be within the set value range, so as to further ensure that the mass ratio of the mixed $C_4F_7N/CO_2$ is always within a constant range and to ensure accurate gas preparation.

Example 3

As shown in FIG. 2, the difference between this embodiment and the foregoing embodiment is that a first differential pressure sensor 518 is provided on the buffer mixing tank 515. By arranging the first differential pressure sensor 518 on the buffer mixing tank 515, the pressure of the $C_4F_7N/CO_2$ mixed gas is tested, and the accuracy of the mixed gas preparation is further monitored. Of course, if the pressure value of the $C_4F_7N/CO_2$ mixed gas deviates from the set range, the first differential pressure sensor 518 also sends a signal to the control center, and the control center will drive the first solenoid valve 511 and the second solenoid valve 512 to adjust the corresponding opening.

Example 4

Figure 3:
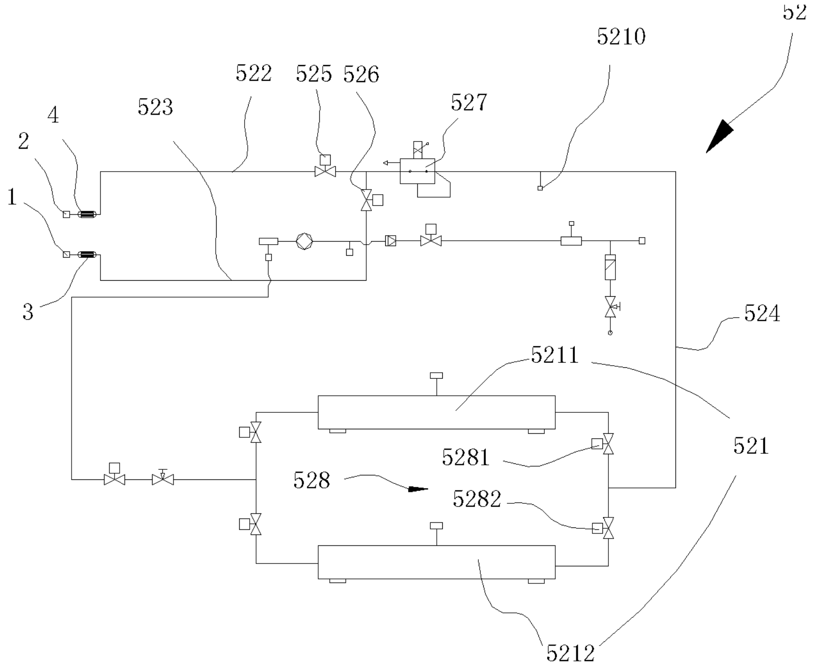
FIG. 3 is a schematic structural diagram of the $C_4F_7N/CO_2$ partial pressure mixing pipeline structure in Example 4 of the present disclosure.

As shown in FIG. 3, the difference between this embodiment and the foregoing embodiment is that this embodiment discloses a specific $C_4F_7N/CO_2$ partial pressure mixing pipeline structure 52. The $C_4F_7N/CO_2$ partial pressure mixing pipeline structure 52 includes partial pressure mixing tanks 521, a third pipe 522, a fourth pipe 523, a fifth pipe 524, a third solenoid valve 525, a fourth solenoid valve 526, a first proportional valve 527, and a gas inlet solenoid valve 528.

In this embodiment, the $C_4F_7N/CO_2$ partial pressure mixing pipeline structure 52 is disclosed with the number of the partial pressure mixing tanks 521 being two, which are the first partial pressure mixing tank 5211 and the second partial pressure mixing tank 5212 respectively. Of course, other numbers of partial pressure mixing tanks 521 should also fall within the protection scope of the present disclosure.

The gas inlet of the third pipe 522 is communicated with the $CO_2$ input port 2, the gas inlet of the fourth pipe 523 is communicated with the $C_4F_7N$ input port 1, and the gas outlet of the third pipe 522 and the gas outlet of the fourth pipe 523 are both communicated with the gas inlet of the fifth pipe 524. The gas outlet of the fifth pipe 524 is communicated with the gas inlet of the first partial pressure mixing tank 5211 and the gas inlet of the second partial pressure mixing tank 5212 respectively. The third solenoid valve 525 is provided on the third pipe 522, the fourth solenoid valve 526 is provided on the fourth pipe 523, the first proportional valve 527 is provided on the fifth pipe 524, and the gas inlet solenoid valve 528 is provided on the corresponding partial pressure mixing tank 521 at the gas inlet. The gas inlet of the first partial pressure mixing tank 5211 is equipped with a first gas inlet solenoid valve 5281, and the gas inlet of the second partial pressure mixing tank 5212 is equipped with a second gas inlet solenoid valve 5282.

When partial pressure preparation for $C_4F_7N/CO_2$ is required, in the present disclosure, the third solenoid valve 525 and the fourth solenoid valve 526 are respectively opened to control the $CO_2$ flow passing through the first pipe 516 per unit time and control the $C_4F_7N$ flow passing through the second pipe 517.

In actual operation, the third solenoid valve 525 and the fourth solenoid valve 526 are not opened at the same time, that is, the $C_4F_7N$ and $CO_2$ of certain pressures are sequentially input into the corresponding partial pressure mixing tank 521. Introduction herein is conducted in the manner of first conveying $C_4F_7N$ to the partial pressure mixing tank 521 and then $CO_2$ to the partial pressure mixing tank 521, and the manner of first conveying $CO_2$ to the partial pressure mixing tank 521 and then $C_4F_7N$ to the partial pressure mixing tank 521 should be also within the protection scope of the present disclosure.

The specific partial pressure preparation steps are as follows.

S1, open the third solenoid valve 525, the fourth solenoid valve 526, the first proportional valve 527 and the first gas inlet solenoid valve 5281, close the second gas inlet solenoid valve 5282, and adjust the opening of the first proportional valve 527; the heated and vaporized $C_4F_7N$ passes through the fourth pipe 523 and the fifth pipe 524 sequentially, and after flow adjustment, the $C_4F_7N$ output from the first proportional valve 527 reaches the set pressure and is input to the first partial pressure mixing tank 5211; the heated $CO_2$ passes through the third pipe 522 and the fifth pipe 524 sequentially, and after flow adjustment, the $CO_2$ output from the first proportional valve 527 reaches the set pressure and is input to the first partial pressure mixing tank 5211; the $C_4F_7N$ and $CO_2$ are mixed in the first partial pressure mixing tank 5211.

S2, upon completing the mixing in the first partial pressure mixing tank 5211, close the first gas inlet solenoid valve 5281 and open the second gas inlet solenoid valve 5282; the heated and vaporized $C_4F_7N$ passes through the fourth pipe 523 and the fifth pipe 524 sequentially, and after flow adjustment, the $C_4F_7N$ output from the first proportional valve 527 reaches the set pressure and is input to the second partial pressure mixing tank 5212; the heated $CO_2$ passes through the third pipe 522 and the fifth pipe 524 sequentially, and after flow adjustment, the $CO_2$ output from the first proportional valve 527 reaches the set pressure and is input to the second partial pressure mixing tank 5212; the $C_4F_7N$ and $CO_2$ are mixed in the second partial pressure mixing tank 5212.

S3, the $C_4F_7N/CO_2$ mixed gas mixed in the first partial pressure mixing tank 5211 is output through the $C_4F_7N/CO_2$ mixed gas output pipeline structure 7; the $C_4F_7N/CO_2$ mixed gas mixed in the second partial pressure mixing tank 5212 is output through $C_4F_7N/CO_2$ mixed gas output pipeline structure 7.

S4, the above steps S1 and S2 are performed alternately, and gas preparation and conveying is alternatively conducted for the first partial pressure mixing tank 5211 and the second partial pressure mixing tank 5212.

The $C_4F_7N/CO_2$ partial pressure mixing pipeline structure 52 of the present disclosure includes a plurality of partial pressure mixing tanks 521, and the plurality of partial pressure mixing tanks 521 are divided into two groups, so that when one group is in gas preparation, the other group is in the state of outputting mixed gas. Thus, the system is always in a state that the gas preparation and outputting of mixed gas are performed simultaneously, which saves gas preparation time and further improves gas preparation efficiency.

In some embodiments, a second differential pressure sensor 5210 is further provided on the fifth pipe 524, and the second differential pressure sensor 5210 is close to the gas outlet of the first proportional valve 527. By providing the second differential pressure sensor 5210 at the gas outlet of the first proportional valve 527, the pressure value of $C_4F_7N$ or $CO_2$ input to the partial pressure mixing tank 521 can be effectively detected online. Of course, if the pressure value of $C_4F_7N$ or $CO_2$ deviates from the set range, the second differential pressure sensor 5210 will send a signal to the control center, and the control center will drive the first proportional valve 527 to adjust the corresponding opening.

Example 5

Figure 4:
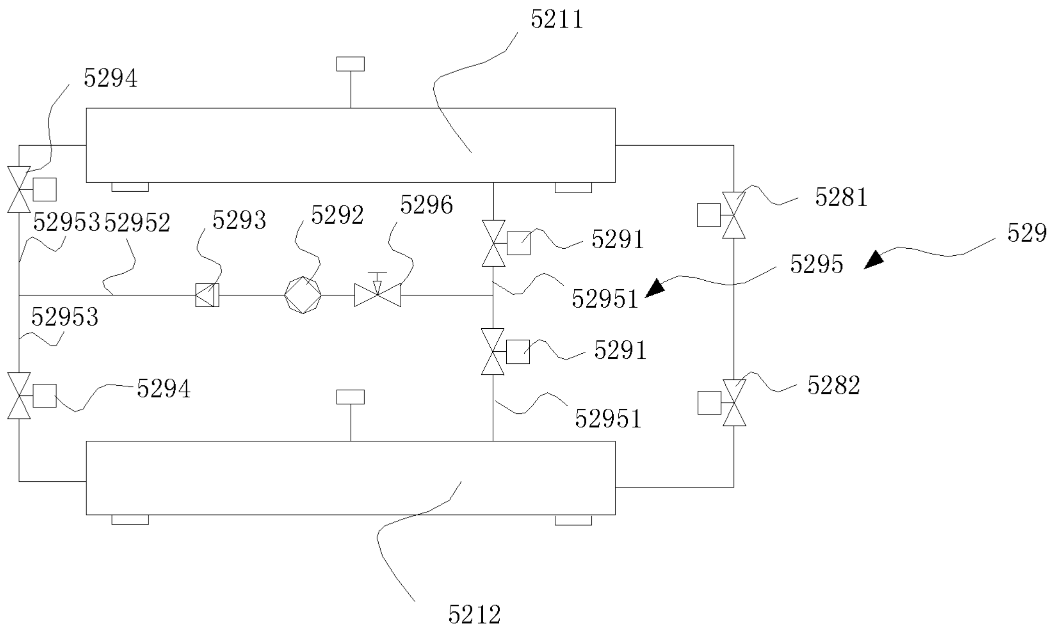
FIG. 4 is a schematic structural diagram of the circulating mixing pipeline structure in Embodiment 5 of the present disclosure.

As shown in FIG. 4, the difference between this embodiment and the foregoing embodiment is that the partial pressure mixing tank 521 is further provided with a circulating mixing pipeline structure 529. The circulating mixing pipeline structure 529 includes a fifth solenoid valve 5291, a first air pump 5292, a first one-way valve 5293, a sixth solenoid valve 5294, and a circulating pipe 5295.

The two ends of the partial pressure mixing tank 521 are respectively provided with a circulating gas inlet and a circulating gas outlet. The two ends of the circulating pipe 5295 are respectively communicated with the circulating gas inlet and the circulating gas outlet. The fifth solenoid valve 5291, the first air pump 5292, the first one-way valve 5293 and the sixth solenoid valve 5294 are sequentially arranged on the circulating pipe 5295 in the order in which the gas flows from the circulating gas outlet to the circulating gas inlet.

In this embodiment, the circulating mixing of the first partial pressure mixing tank 5211 is taken as an example to illustrate the working principle. The circulating mixing principle of the second partial pressure mixing tank 5212 refers to the first partial pressure mixing tank 5211.

In operation, the fifth solenoid valve 5291, the first air pump 5292, the first one-way valve 5293, the sixth solenoid valve 5294 and the first gas inlet solenoid valve 5281 are opened; the second gas inlet solenoid valve 5282 is closed, and the $C_4F_7N$ and $CO_2$ in the partial pressure mixing tank 521 are output from the circulating gas inlet of the partial pressure mixing tank 521, and after passing through the circulating pipe 5295, are then input from the circulating gas outlet of the partial pressure mixing tank 521 into the partial pressure mixing tank 521, and so on.

Compared with the prior art, which only relies on the free movement of gas molecules to achieve gas mixing, the present disclosure provides a circulating mixing pipeline structure 529 to allow the $C_4F_7N$ and $CO_2$ to be mixed in a flowing state, which can further improve the mixing efficiency of $C_4F_7N$ and $CO_2$ and will ultimately improve the gas preparation efficiency.

Example 6

As shown in FIG. 4, the difference between this embodiment and the foregoing embodiment is that when two partial pressure mixing tanks 521 (the first partial pressure mixing tank 5211, the second partial pressure mixing tank 5212) are used for the $C_4F_7N/CO_2$ partial pressure mixing pipeline structure 52, the present disclosure adopts the following specific circulating mixing pipeline structure 529 to simplify the pipeline structure.

The circulating pipe 5295 includes a circulating gas inlet section 52951, a circulating section 52952, and a circulating gas outlet section 52593 that are communicated with each other end to end sequentially. The gas inlet of the circulating gas inlet section 52951 is communicated with the circulating gas outlet of the corresponding partial pressure mixing tank 521. The fifth solenoid valve 5291 is arranged on the corresponding circulating gas inlet section 52951. The gas outlets of the two circulating gas inlet sections 52951 are both communicated with the gas inlet of one circulating section 52952.

The first air pump 5292 and the first one-way valve 5293 are all provided on the circulating section 52952. The gas outlet of the circulating section 52952 is communicated with the gas inlets of the two circulating gas outlet sections 52591. The sixth solenoid valve 5294 is provided on the corresponding circulating gas outlet section 52593, and the gas outlet of the circulating gas outlet section 52593 is communicated with the circulating gas inlet of the corresponding partial pressure mixing tank 521.

When the $C_4F_7N$ and $CO_2$ gases in the first partial pressure mixing tank 5211 are mixed, the first gas inlet solenoid valve 5281, the first air pump 5292, the first one-way valve 5293, and the six solenoid valve 5294 and the fifth solenoid valve 5291 close to the first partial pressure mixing tank 5211 are opened, and the second gas inlet solenoid valve 5282, the sixth solenoid valve 5294 and the fifth solenoid valve 5291 close to the second partial pressure mixing tank 5212 are closed; then the $C_4F_7N$ and $CO_2$ of the first partial pressure mixing tank 5211 can be mixed in the circulating mixing pipeline structure 529. When the $C_4F_7N$ and $CO_2$ gases in the second partial pressure mixing tank 5212 are mixed, the second gas inlet solenoid valve 5282, the first air pump 5292, the first one-way valve 5293, the sixth solenoid valve 5294 and the fifth solenoid valve 5291 close to the second partial pressure mixing tank 5212 are opened, and the first gas inlet solenoid valve 5281, the sixth solenoid valve 5294 and the fifth solenoid valve 5291 close to the first partial pressure mixing tank 5211 are closed; then the $C_4F_7N$ and $CO_2$ in the first partial pressure mixing tank 5212 can be mixed in the circulating mixing pipeline structure 529.

Since the present disclosure only adopts one circulating section 52952, the mixing of the gas in the two partial pressure mixing tanks 5211 can be realized, thereby simplifying the pipeline design and improving the integration effect of the pipelines.

In some embodiments, a fourth proportional valve 5296 is also provided at the beginning of the circulating section 52952, and the fourth proportional valve 5296 is close to the gas inlet of the first air pump 5292.

By providing the fourth proportional valve 5296, the flows of $C_4F_7N$ and $CO_2$ input into the circulating pipe 5295 can be adjusted. Thereby, the amount of $C_4F_7N$ and $CO_2$ to be mixed per unit time can be controlled according to the specific gas preparation requirements and the gas preparation environment, and the flexibility of mixing is improved.

Figure 5:
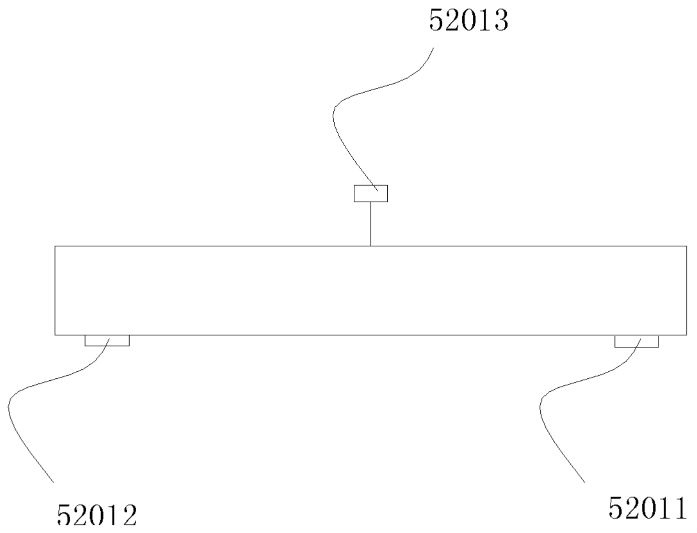
FIG. 5 is a schematic structural diagram of a partial pressure mixing tank in Example 6 of the present disclosure.

As shown in FIG. 5, in some embodiments, a first mass sensor 52011 is provided at the gas inlet of the partial pressure mixing tank 521, and a second mass sensor 52012 is provided at the gas outlet of the partial pressure mixing tank 521.

In some embodiments, a fourth differential pressure sensor 52013 is further provided on the partial pressure mixing tank 521.

By providing quality sensors at the inlet and outlet of the partial pressure mixing tank 521 respectively to perform online monitoring of the gas quality in the partial pressure mixing tank 521, in combination of the online monitoring of the differential pressure sensor to achieve mutual feedback of quality value and pressure value, it is possible to monitor the accuracy of $C_4F_7N$ and $CO_2$ gas preparation more accurately.

Example 7

Figure 6:
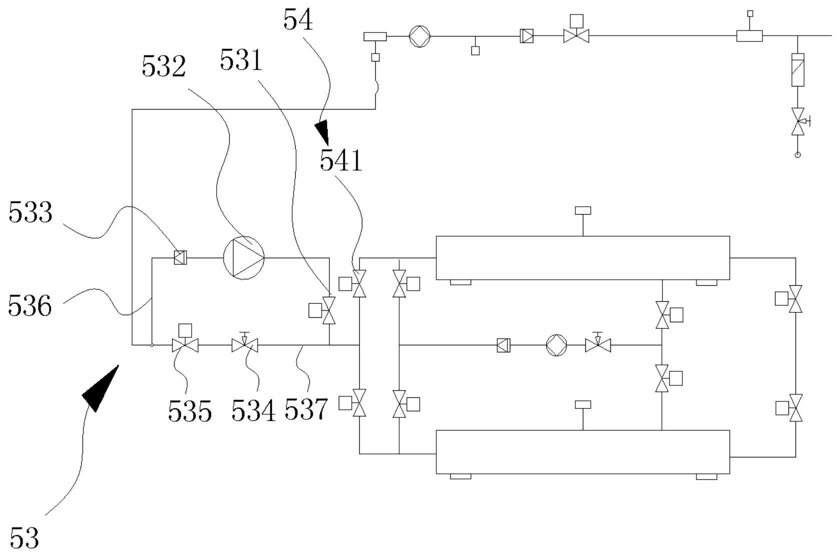
FIG. 6 is a schematic structural diagram of the output pipeline structure in Embodiment 7 of the present disclosure.

As shown in FIG. 6, the difference between this embodiment and the foregoing embodiment is that the $C_4F_7N/CO_2$ mixing pipeline structure 5 further includes an output pipeline structure 53 for extracting the $C_4F_7N/CO_2$ mixed gas in the partial pressure mixing tank.

The output pipeline structure 53 includes a seventh solenoid valve 531, a Fujiwara oil-free vacuum pump 532 or a negative pressure pump, a second one-way valve 533, a second proportional valve 534, an eighth solenoid valve 535, a first output pipe 536, and a second output pipe 537.

The first output pipe 536 and the second output pipe 537 are arranged in parallel, the gas inlet of the first output pipe 536 and the gas inlet of the second output pipe 537 are both communicated with the gas outlet of the partial pressure mixing tank, and the gas outlet of the first output pipe 536 and the gas outlet of the second output pipe 537 are both communicated with the $C_4F_7N/CO_2$ mixed gas output pipeline structure.

The seventh solenoid valve 531, the Fujiwara oil-free vacuum pump 532 or the negative pressure pump, and the second one-way valve 533 are sequentially arranged on the first output pipe 536 along the gas conveying direction.

The second proportional valve 534 and the eighth solenoid valve 535 are sequentially arranged on the second output pipe 537 along the gas flow direction.

In order to fully output the $C_4F_7N/CO_2$ mixed gas output from the partial pressure mixing tank 521, the present disclosure is equipped in the $C_4F_7N/CO_2$ mixing pipeline structure 5 with the output pipeline structure 53 for extracting the $C_4F_7N/CO_2$ mixed gas in the partial pressure mixing tank 521.

The output pipeline structure 53 realizes the output of $C_4F_7N/CO_2$ mixed gas by the following steps. The $C_4F_7N/CO_2$ mixed gas prepared through the partial pressure mixing tank has a relatively high pressure at the beginning of its output. At this time, by closing the seventh solenoid valve 531 and opening the second proportional valve 534 and the eighth solenoid valve 535, the $C_4F_7N/CO_2$ mixed gas is input to the subsequent pipes through the second output pipe 537, and then output from the $C_4F_7N/CO_2$ mixed gas output pipeline structure. When the pressure of the $C_4F_7N/CO_2$ mixed gas in the partial pressure mixing tank 521 is lower than the set value (130 kPa), at this time, it is difficult to output the remaining $C_4F_7N/CO_2$ mixed gas in the partial pressure mixing tank through only the $C_4F_7N/CO_2$ mixed gas output pipeline structure in combination with the second output pipeline 537. At this time, by closing the second proportional valve 534 and the eighth solenoid valve 535, and opening the seventh solenoid valve 531, the Fujiwara oil-free vacuum pump 532 or negative pressure pump, the $C_4F_7N/CO_2$ mixed gas is input to the subsequent pipes from the first output pipe 536 under the suction effect of the Fujiwara oil-free vacuum pump 532 or the negative pressure pump, until the pressure of the $C_4F_7N/CO_2$ mixed gas in the partial pressure mixing tank 521 is reduced to 5 kPa.

The output pipeline structure 53 of the present disclosure provides two sets of gas transmission branch pipelines. When the pressure of the mixed gas is high, the opening of the second output pipe 537 can be used to complete the output of the $C_4F_7N/CO_2$ mixed gas. The setting of the second proportional valve 534 in the present disclosure is to control the output pressure of the mixed gas, and adjust accordingly with the output of the $C_4F_7N/CO_2$ mixed gas, so as to ensure the stability of the gas output. When the pressure of the mixed gas is relatively small, through the first output pipeline 536 and with the effect of the Fujiwara oil-free vacuum pump 532 or the negative pressure pump, it is possible to ensure that the mixed gas in the partial pressure mixing tank 521 is output as much as possible, and prevent cross contamination from occurring when preparing mixed gas of different proportions and different pressures next time. In addition, the vacuum-pumping difference between the Fujiwara oil-free vacuum pump and the ordinary pipeline is that the ordinary vacuum pump has lubricating oil. During the preparation of the mixed gas, if the ordinary vacuum pump is used, the gas may be polluted.

In some embodiments, the gas outlet of each partial pressure mixing tank 521 is respectively communicated with the inlet end of an output pipeline structure 53 through a transition pipe 54, and a tenth solenoid valve 541 is arranged on the transition pipe 54.

By opening and closing the corresponding tenth solenoid valve 541, the mixed gas of different partial pressure mixing tanks 521 can be selectively input into the output pipeline structure 53 according to actual needs.

Example 8

Figure 7:
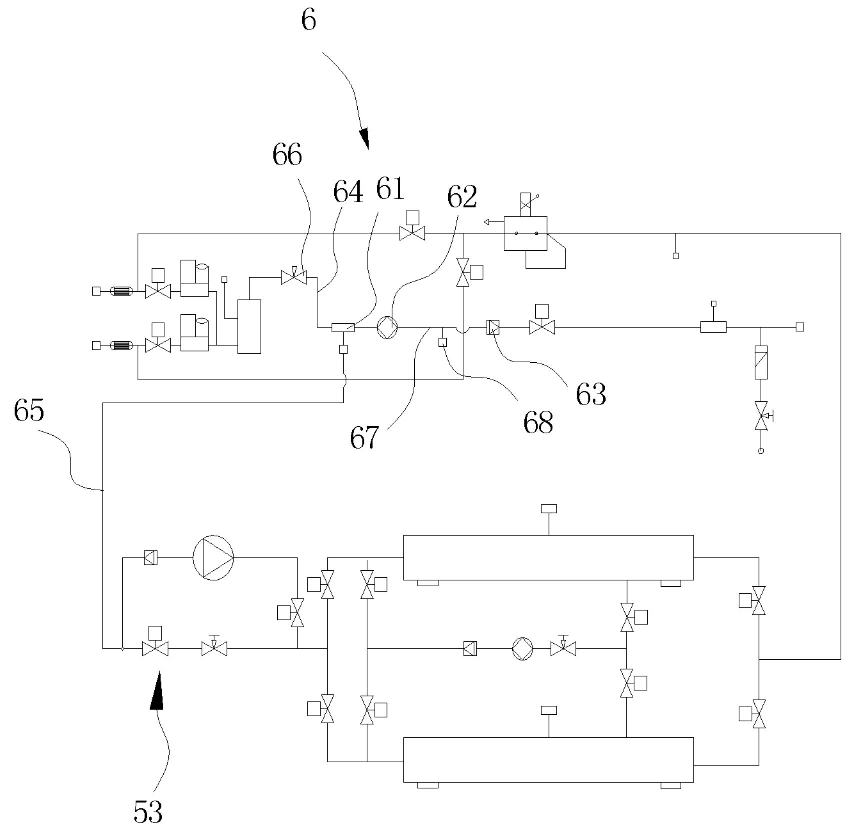
FIG. 7 is a schematic structural diagram of a pressurized pipeline structure in Embodiment 8 of the present disclosure.

As shown in FIG. 7, the difference between this embodiment and the foregoing embodiment is that the multifunctional $C_4F_7N/CO_2$ mixed gas preparation system further includes a pressurizing pipeline structure 6, which is used to pressurize the $C_4F_7N/CO_2$ mixed gas output from the $C_4F_7N/CO_2$ mixing pipeline structure 5.

The pressurizing pipeline structure 6 includes a first buffer tank 61, a second air pump 62, a third one-way valve 63, a first pressurizing pipe 64, a second pressurizing pipe 65, a third proportional valve 66, and a third pressurizing pipe 67.

Both ends of the first pressurizing pipe 64 are respectively communicated with the outlet end of the $C_4F_7N/CO_2$ dynamic gas preparation pipeline structure 51 and the first gas inlet of the first buffer tank 61.

Both ends of the second pressurizing pipe 65 are respectively communicated with the outlet end of the $C_4F_7N/CO_2$ partial pressure mixing pipeline structure 52 and the second inlet of the first buffer tank 61.

Both ends of the third pressurizing pipe 67 are respectively communicated with the gas outlet of the first buffer tank 61 and the inlet end of the $C_4F_7N/CO_2$ mixed gas output pipeline structure 7.

The third proportional valve 66 is arranged on the first pressurizing pipe 64, and the second air pump 62 and the third one-way valve 63 are sequentially arranged on the third pressurizing pipe 67 along the gas flow direction. The second air pump 62 of the present disclosure is preferably a compressor, and other air pumps in the prior art should also fall within the protection scope of the present disclosure.

Due to the fact that in actual operation, especially for equipment manufacturers to develop 1000 kV GIL and the equipment gas chamber is large, it is difficult for the $C_4F_7N/CO_2$ mixed gas prepared through $C_4F_7N/CO_2$ mixing pipeline structure 5 to be directly input to the $C_4F_7N/CO_2$ mixed gas output pipeline structure 7. Therefore, the present disclosure is provided with a pressurizing pipeline structure 6.

When outputting the quantitative $C_4F_7N/CO_2$ mixed gas prepared through the $C_4F_7N/CO_2$ dynamic gas preparation pipeline structure 51, in the present disclosure, by opening the third gas pump 62 and the third one-way valve 63, adjusting the opening of the third proportional valve 66, and closing the output pipeline structure 53, it is possible to allow quantitative $C_4F_7N/CO_2$ mixed gas to be input through the first pressurizing pipe 64 to the first buffer tank 61 for buffering, and then output to the $C_4F_7N/CO_2$ mixed gas output pipeline structure 7 through the third pressurizing pipe 67.

When outputting the $C_4F_7N/CO_2$ mixed gas of certain pressure prepared through the $C_4F_7N/CO_2$ partial pressure mixing pipeline structure 52, by opening the second air pump 62, the third one-way valve 63 and the output pipeline structure 53, and closing the third proportional valve 66 is closed, it is possible to allow the $C_4F_7N/CO_2$ mixed gas of certain pressure to be input through the second pressurizing pipe 65 to the first buffer tank 61 for buffering, and is output to the $C_4F_7N/CO_2$ mixed gas output pipeline structure 7 through the third pressurizing pipe 67.

In some embodiments, a sixth differential pressure sensor 68 is further arranged on the third pressurizing pipe 67, and the sixth differential pressure sensor 68 is close to the gas outlet of the second air pump 62. The pressure of the mixed gas input into the third pressurizing pipe 67 is monitored online by the sixth differential pressure sensor 68.

Example 9

Figure 8:
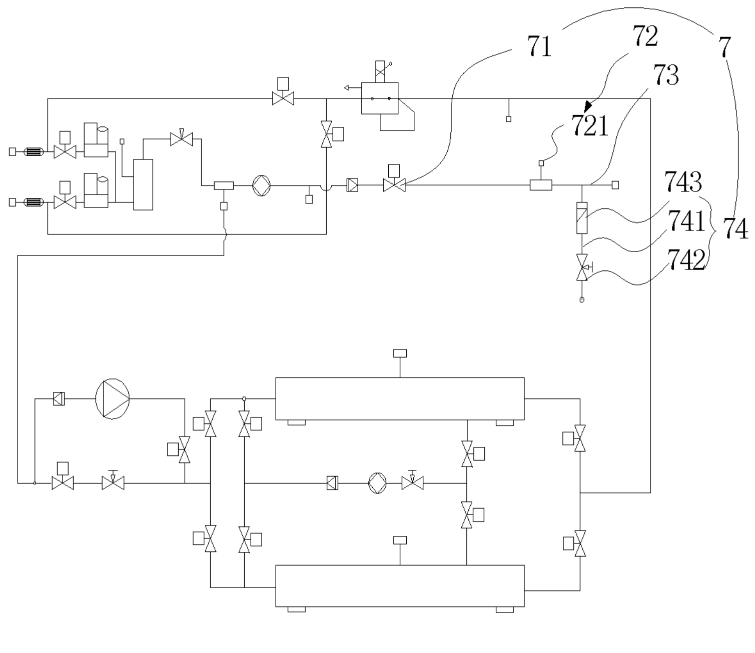
FIG. 8 is a schematic structural diagram of a mixed gas output pipeline structure in Embodiment 9 of the present disclosure.

As shown in FIG. 8, the difference between this embodiment and the foregoing embodiment is that a specific $C_4F_7N/CO_2$ mixed gas output pipeline structure 7 is provided.

The $C_4F_7N/CO_2$ mixed gas output pipeline structure 7 includes a ninth solenoid valve 71, a second buffer tank 72, and a mixed gas outlet pipe 73. The gas inlet of the mixed gas outlet pipe 73 is connected to the outlet end of the $C_4F_7N/CO_2$ mixing pipeline structure 5. The ninth solenoid valve 71 and the second buffer tank 72 are sequentially arranged on the mixed gas outlet pipe 73 along the gas flow.

In operation, by opening the ninth solenoid valve 71, the $C_4F_7N/CO_2$ mixed gas is input through the mixed gas outlet pipe 73 to the second buffer tank 72 for buffering, and is output to external equipment through the second buffer tank 72.

In some embodiments, a third differential pressure sensor 721 is arranged on the second buffer tank 72. The pressure of the mixed gas in the second buffer tank 72 is monitored online by the third differential pressure sensor 721.

Example 10

As shown in FIG. 8, the difference between this embodiment and the foregoing embodiment is that the $C_4F_7N/CO_2$ mixed gas output pipeline structure 7 further includes a sampling branch structure 74. The sampling branch structure 74 includes a sampling branch pipe 741, a pressure reducing and stabilizing valve 742 and a fifth proportional valve 743. The gas inlet of the sampling branch pipe 741 is communicated with the gas outlet of the second buffer tank 72. The pressure reducing and stabilizing valve 742 and the fifth proportional valve 743 are sequentially arranged on the sampling branch pipe 741 along the gas flow.

In order to further ensure the accuracy and purity of the mixed preparation of the $C_4F_7N/CO_2$ mixed gas output to the equipment, a sampling branch structure 74 is arranged in the $C_4F_7N/CO_2$ mixed gas output pipeline structure 7. By opening the pressure reducing and stabilizing valve 742 and adjusting the fifth proportional valve 743, a small amount of $C_4F_7N/CO_2$ mixed gas is output from the sampling branch pipe 741, and sampling is performed at the end of the sampling branch pipe 741. The sample is analyzed to ensure the purity and accuracy of the $C_4F_7N/CO_2$ mixed gas.

Example 11

Figure 9:
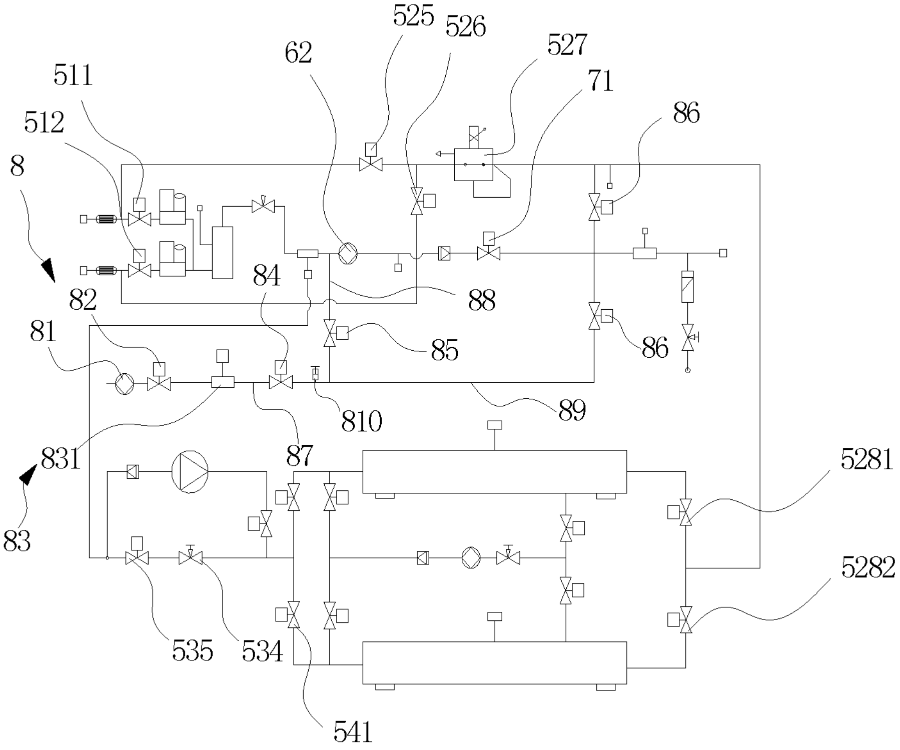
FIG. 9 is a schematic structural diagram of the vacuum pipeline structure in Embodiment 10 of the present disclosure.

As shown in FIG. 9, the difference between this embodiment and the foregoing embodiment is that the multifunctional $C_4F_7N/CO_2$ mixed gas preparation system further includes a vacuum pipeline structure 8. This embodiment provides a specific vacuum pipeline structure 8, including a fourth air pump 81, a sixth proportional valve 82, a third buffer tank 83, an eleventh solenoid valve 84, a twelfth solenoid valve 85, a thirteenth solenoid valve 86, a main vacuum pipe 87, a first vacuum branch pipe 88, and second vacuum branch pipe 89.

The first vacuum branch pipe 88 and the second vacuum branch pipe 89 are arranged in parallel. The gas outlet of the first vacuum branch pipe 88 and the gas outlet of the second vacuum branch pipe are both communicated with the gas inlet of the main vacuum pipe 87, the gas inlet of the first vacuum branch pipe 88 is communicated with the outlet end of the $C_4F_7N/CO_2$ dynamic gas preparation pipeline structure 51, and the gas inlet of the second vacuum branch pipe 89 is communicated with the gas outlet of the first proportional valve 527.

The fourth air pump 81, the sixth proportional valve 82, the third buffer tank 83, and the eleventh solenoid valve 84 are sequentially arranged on the main vacuum pipe 87 along the gas flow direction.

The twelfth solenoid valve 85 is arranged on the first vacuum branch pipe 88.

The thirteenth solenoid valve 86 is arranged on the second vacuum branch pipe 89.

In order to eliminate other impurities such as air in the pipeline and prevent the presence of impurities from affecting the accuracy of the prepared mixed gas, it is also necessary to vacuumize the current gas preparation system using the vacuum pipeline structure 8 of the present disclosure before gas preparation.

By opening the fourth air pump 81, the sixth proportional valve 82, the eleventh solenoid valve 84, the twelfth solenoid valve 85, the first solenoid valve 511, and the second solenoid valve 512, the vacuum treatment to the $C_4F_7N/CO_2$ dynamic gas preparation pipeline structure 51 is performed.

By opening the fourth air pump 81, the sixth proportional valve 82, the twelfth solenoid valve 85, the eleventh solenoid valve 84, the third gas pump 62, and the ninth solenoid valve 71, the vacuum treatment to the $C_4F_7N/CO_2$ mixed gas output pipeline structure is performed.

By opening the fourth air pump 81, the sixth proportional valve 82, the thirteenth solenoid valve 86, the third solenoid valve 525, the fourth solenoid valve 526, the first proportional valve 527, the first gas inlet solenoid valve 5281, the second gas inlet solenoid valve 5282, the tenth solenoid valve 541, the second proportional valve 534, the eighth solenoid valve 535, the twelfth solenoid valve 85, the second air pump 62, and the ninth solenoid valve 71, the vacuum treatment to the $C_4F_7N/CO_2$ partial pressure mixing pipeline structure is performed.

In some embodiments, a fifth differential pressure sensor 831 is further arranged on the third buffer tank 83. The fifth differential pressure sensor 831 is used to monitor the pressure of the gas in the third buffer tank 83 online to determine the degree of vacuum.

In some embodiments, a pressure control switch 810 is further arranged on the main vacuum pipe 87, and the pressure control switch 810 is close to the gas outlet of the eleventh solenoid valve 84. The degree of vacuum is controlled by the pressure control switch 810, and the vacuum of the present disclosure is controlled at 0.08 MPa.

Example 12

The difference between this embodiment and the foregoing embodiment is that $C_4F_7N$ is input to the $C_4F_7N$ input port 1 through the $C_4F_7N$ gas tank, and $CO_2$ is input to the $CO_2$ input port 2 through the $CO_2$ gas tank. A heating and vaporizing device of the prior art is installed on the periphery of the $C_4F_7N$ gas tank and the periphery of the $CO_2$ gas tank. For example, a heating pipe can be wound around the gas tank, and hot water or other high-temperature medium can be filled in the heating pipe.

Example 13

Figure 10:
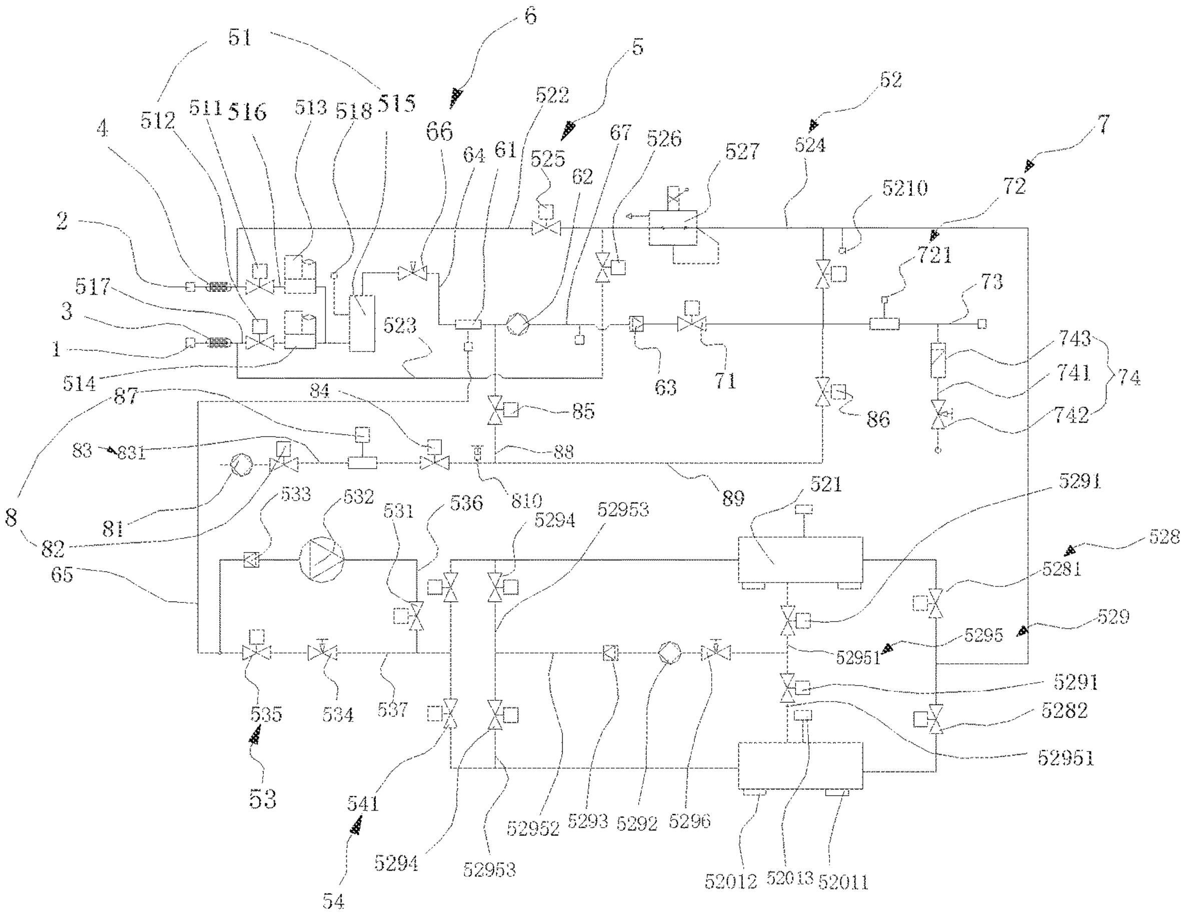
FIG. 10 is a schematic structural diagram of a multifunctional $C_4F_7N/CO_2$ mixed gas preparation system in Embodiment 13 of the present disclosure.

As shown in FIG. 10, a multifunctional $C_4F_7N/CO_2$ mixed gas preparation system is disclosed in this embodiment, including $C_4F_7N$ input port 1, a $CO_2$ input port 2, a $C_4F_7N$ heat exchanger 3, a $CO_2$ heat exchanger 4, a $C_4F_7N/CO_2$ mixing pipeline structure 5, a $C_4F_7N/CO_2$ mixed gas output pipeline structure 7.

The $C_4F_7N$ heat exchanger 3 is used to heat and vaporize the $C_4F_7N$ input through the $C_4F_7N$ input port 1. The $CO_2$ heat exchanger 4 is used to heat and vaporize the $CO_2$ input through the $CO_2$ input port 2. The $C_4F_7N/CO_2$ mixing pipeline structure 5 is used to mix the heated $C_4F_7N$ and $CO_2$, and the $C_4F_7N/CO_2$ mixed gas output pipeline structure 7 is used to output the $C_4F_7N/CO_2$ mixed gas.

The $C_4F_7N/CO_2$ mixing pipeline structure 5 includes a $C_4F_7N/CO_2$ dynamic gas preparation pipeline structure 51 and a $C_4F_7N/CO_2$ partial pressure mixing pipeline structure 52.

The $C_4F_7N/CO_2$ dynamic gas preparation pipeline structure 51 and the $C_4F_7N/CO_2$ partial pressure mixing pipeline structure 52 are arranged in parallel. The $C_4F_7N/CO_2$ dynamic gas preparation pipeline structure 51 is used to quantitatively mix the heated $CO_2$ and $C_4F_7N$. The $C_4F_7N/CO_2$ partial pressure mixing pipeline structure 52 is used to mix the heated $CO_2$ and $C_4F_7N$ at certain pressures.

The $C_4F_7N/CO_2$ partial pressure mixing pipeline structure 52 includes a partial pressure mixing tank 521, and the partial pressure mixing tank 521 is used to mix $CO_2$ and $C_4F_7N$ of certain pressures. A plurality of partial pressure mixing tanks 521 are arranged in parallel and perform gas preparation and gas transmission alternately.

The $C_4F_7N/CO_2$ dynamic gas preparation pipeline structure 51 includes a first solenoid valve 511, a second solenoid valve 512, a first thermal mass flow meter 513, a second thermal mass flow meter 514, a buffer mixing tank 515, a first pipe 516, and a second pipe 517.

The buffer mixing tank 515 is provided with a first gas inlet, a second gas inlet, and a first mixed gas outlet.

The gas outlet of the $CO_2$ heat exchanger 4 is communicated with the first gas inlet through the first pipe 516, and the first solenoid valve 511 and the first thermal mass flow meter 513 are both arranged on the first pipe 516. The gas outlet of the $C_4F_7N$ heat exchanger 3 is communicated with the second gas inlet through the second pipe 517, and the second solenoid valve 512 and the second thermal mass flow meter 514 are both arranged on the second pipe 517. The first mixed gas outlet is communicated with the inlet end of the $C_4F_7N/CO_2$ mixed gas output pipeline structure 7.

A first differential pressure sensor 518 is arranged on the buffer mixing tank 515. By arranging the first differential pressure sensor 518 on the buffer mixing tank 515, the pressure of the $C_4F_7N/CO_2$ mixed gas is tested, and the accuracy of the mixed gas preparation is further monitored. Of course, if the pressure value of the $C_4F_7N/CO_2$ mixed gas deviates from the set range, the first differential pressure sensor 518 also sends a signal to the control center, and the control center will drive the first solenoid valve 511 and the second solenoid valve 512 to adjust the corresponding opening.

The $C_4F_7N/CO_2$ partial pressure mixing pipeline structure 52 includes a partial pressure mixing tank 521, a third pipe 522, a fourth pipe 523, a fifth pipe 524, a third solenoid valve 525, a fourth solenoid valve 526, a first proportional valve 527, and a gas inlet solenoid valve 528.

In this embodiment, the $C_4F_7N/CO_2$ partial pressure mixing pipeline structure 52 is disclosed with the number of the partial pressure mixing tanks 521 being two, which are the first partial pressure mixing tank 5211 and the second partial pressure mixing tank 5212 respectively. Of course, other numbers of partial pressure mixing tanks 521 should also fall within the protection scope of the present disclosure.

The gas inlet of the third pipe 522 is communicated with the $CO_2$ input port 2, the gas inlet of the fourth pipe 523 is communicated with the $C_4F_7N$ input port 1, and the gas outlet of the third pipe 522 and the gas outlet of the fourth pipe 523 are both communicated with the gas inlet of the fifth pipe 524. The gas outlet of the fifth pipe 524 is communicated with the gas inlet of the first partial pressure mixing tank 5211 and the gas inlet of the second partial pressure mixing tank 5212 respectively. The third solenoid valve 525 is arranged on the third pipe 522, the fourth solenoid valve 526 is arranged on the fourth pipe 523, the first proportional valve 527 is arranged on the fifth pipe 524, and the gas inlet solenoid valve 528 is arranged at the gas inlet of the corresponding partial pressure mixing tank 521. The gas inlet of the first partial pressure mixing tank 5211 is equipped with a first gas inlet solenoid valve 5281, and the gas inlet of the second partial pressure mixing tank 5212 is equipped with a second gas inlet solenoid valve 5282.

A second differential pressure sensor 5210 is further arranged on the fifth pipe 524, and the second differential pressure sensor 5210 is close to the gas outlet of the first proportional valve 527. By providing the second differential pressure sensor 5210 at the gas outlet of the first proportional valve 527, the pressure of the output mixed gas is monitored.

The partial pressure mixing tank 521 is also equipped with a circulating mixing pipeline structure 529. The circulating mixing pipeline structure 529 includes a fifth solenoid valve 5291, a first air pump 5292, a first one-way valve 5293, a sixth solenoid valve 5294, and a circulating pipe 5295.

The two ends of the partial pressure mixing tank 521 are respectively provided with a circulating gas inlet and a circulating gas outlet. The two ends of the circulating pipe 5295 are respectively communicated with the circulating gas inlet and the circulating gas outlet. The fifth solenoid valve 5291, the first air pump 5292, the first one-way valve 5293 and the sixth solenoid valve 5294 are sequentially arranged on the circulating pipe 5295 in the order in which the gas flows from the circulating gas outlet to the circulating gas inlet.

The circulating pipe 5295 includes a circulating gas inlet section 52951, a circulating section 52952, and a circulating gas outlet section 52593 that are communicated with each other end to end sequentially. The gas inlet of the circulating gas inlet section 52951 is communicated with the circulating gas outlet of the corresponding partial pressure mixing tank 521. The fifth solenoid valve 5291 is arranged on the corresponding circulating gas inlet section 52951. The gas outlets of the two circulating gas inlet sections 52951 are both communicated with the gas inlet of one circulating section 52952.

The first air pump 5292 and the first one-way valve 5293 are all arranged on the circulating section 52952, and the gas outlet of the circulating section 52952 is communicated with the gas inlets of both the two circulating gas outlet sections 52591. The sixth solenoid valve 5294 is arranged on the corresponding circulating gas outlet section 52593, and the gas outlet of the circulating gas outlet section 52593 is communicated with the circulating gas inlet of the corresponding partial pressure mixing tank 521.

A fourth proportional valve 5296 is also arranged at the beginning of the circulating section 52952, and the fourth proportional valve 5296 is close to the gas inlet of the first air pump 5292.

A first mass sensor 52011 is provided at the gas inlet of the partial pressure mixing tank 521, and a second mass sensor 52012 is provided at the gas outlet of the partial pressure mixing tank 521.

A fourth differential pressure sensor 52013 is also provided on the partial pressure mixing tank 521.

The $C_4F_7N/CO_2$ mixing pipeline structure 5 further includes an output pipeline structure 53 for extracting the $C_4F_7N/CO_2$ mixed gas in the partial pressure mixing tank 521.

The output pipeline structure 53 includes a seventh solenoid valve 531, a Fujiwara oil-free vacuum pump 532 or a negative pressure pump, a second one-way valve 533, a second proportional valve 534, an eighth solenoid valve 535, a first output pipe 536, and a second output pipe 537.

The first output pipe 536 and the second output pipe 537 are arranged in parallel, the gas inlet of the first output pipe 536 and the gas inlet of the second output pipe 537 are both communicated with the gas outlet of the partial pressure mixing tank 521, and the gas outlet of the first output pipe 536 and the gas outlet of the second output pipe 537 are both communicated with the $C_4F_7N/CO_2$ mixed gas output pipeline structure 7.

The seventh solenoid valve 531, the Fujiwara oil-free vacuum pump 532 or the negative pressure pump, and the second one-way valve 533 are sequentially arranged on the first output pipe 536 along the gas conveying direction.

The second proportional valve 534 and the eighth solenoid valve 535 are sequentially arranged on the second output pipe 537 along the gas flow direction.

The gas outlet of each partial pressure mixing tank 521 is respectively communicated with the inlet end of an output pipeline structure 53 through a transition pipe 54, and a tenth solenoid valve 541 is arranged on the transition pipe 54.

The multifunctional $C_4F_7N/CO_2$ mixed gas preparation system further includes a pressurizing pipeline structure 6, which is used to pressurize the $C_4F_7N/CO_2$ mixed gas output from the $C_4F_7N/CO_2$ mixing pipeline structure 5.

The pressurizing pipeline structure 6 includes a first buffer tank 61, a second air pump 62, a third one-way valve 63, a first pressurizing pipe 64, a second pressurizing pipe 65, a third proportional valve 66, and a third pressurizing pipe 67.

Both ends of the first pressurizing pipe 64 are respectively communicated with the outlet end of the $C_4F_7N/CO_2$ dynamic gas preparation pipeline structure 51 and the first gas inlet of the first buffer tank 61.

Both ends of the second pressurizing pipe 65 are respectively communicated with the outlet end of the $C_4F_7N/CO_2$ partial pressure mixing pipeline structure 52 and the second inlet of the first buffer tank 61.

Both ends of the third pressurizing pipe 67 are respectively communicated with the gas outlet of the first buffer tank 61 and the inlet end of the $C_4F_7N/CO_2$ mixed gas output pipeline structure 7.

The third proportional valve 66 is provided on the first pressurizing pipe 64, and the second air pump 62 and the third one-way valve 63 are sequentially arranged on the third pressurizing pipe 67 along the gas flow direction.

A sixth differential pressure sensor 68 is further provided on the third pressurizing pipe 67, and the sixth differential pressure sensor 68 is close to the gas outlet of the second air pump 62.

The $C_4F_7N/CO_2$ mixed gas output pipeline structure 7 includes a ninth solenoid valve 71, a second buffer tank 72, and a mixed gas outlet pipe 73. The gas inlet of the mixed gas outlet pipe 73 is communicated with the outlet end of the $C_4F_7N/CO_2$ mixing pipeline structure 5. The ninth solenoid valve 71 and the second buffer tank 72 are sequentially arranged on the mixed gas outlet pipe 73 along the gas flow.

A third differential pressure sensor 721 is provided on the second buffer tank 72.

The $C_4F_7N/CO_2$ mixed gas output pipeline structure 7 further includes a sampling branch structure 74. The sampling branch structure 74 includes a sampling branch pipe 741, a pressure reducing and stabilizing valve 742 and a fifth proportional valve 743. The gas inlet of the sampling branch pipe 741 is communicated with the gas outlet of the second buffer tank 72. The pressure reducing and stabilizing valve 742 and the fifth proportional valve 743 are sequentially arranged on the sampling branch pipe 741 along the gas flow.

The multifunctional $C_4F_7N/CO_2$ mixed gas preparation system further includes a vacuum pipeline structure 8. This embodiment provides a specific vacuum pipeline structure 8, including a fourth air pump 81, a sixth proportional valve 82, a third buffer tank 83, an eleventh solenoid valve 84, a twelfth solenoid valve 85, a thirteenth solenoid valve 86, a main vacuum pipe 87, a first vacuum branch pipe 88, and second vacuum branch pipe 89.

The first vacuum branch pipe 88 and the second vacuum branch pipe 89 are arranged in parallel. The outlet of the first vacuum branch pipe 88 and the outlet of the second vacuum branch pipe are both communicated to the gas inlet of the main vacuum pipe 87, the gas inlet of the first vacuum branch pipe 88 is communicated with the outlet end of the $C_4F_7N/CO_2$ dynamic gas preparation pipeline structure 51, and the gas inlet of the second vacuum branch pipe 89 is communicated with the gas outlet of the first proportional valve 527.

The fourth air pump 81, the sixth proportional valve 82, the third buffer tank 83, and the eleventh solenoid valve 84 are sequentially arranged on the main vacuum pipe 87 along the gas flow direction.

The twelfth solenoid valve 85 is arranged on the first vacuum branch pipe 88.

The thirteenth solenoid valve 86 is arranged on the second vacuum branch pipe 89.

A fifth differential pressure sensor 831 is further arranged on the third buffer tank 83.

A pressure control switch 810 is further provided on the main vacuum pipe 87, and the pressure control switch 810 is close to the gas outlet of the eleventh solenoid valve 84.

Example 14

For a GIL gas chamber with a length of 18 m and an inner diameter of 1 m, it is necessary to prepare $C_4F_7N/CO_2$ mixed gas of 10% of 0.5 MPa (the volume ratio of $C_4F_7N$ to $CO_2$ is 1:9). The different gas preparation methods and their effects are as follows.

The qualities of $C_4F_7N$ and $CO_2$ required:

GIL pipe volume: $V1=\pi r^2 d=3.14\times 0.25\times 18=14\ m^3$

Required Mixed gas volume: $V_2=6V_1=84\ m^3$

Required $C_4F_7N$ volume: $V(C_4F_7N)=84\times 10\%=8.4\ m^3$

Required $C_4F_7N$ quality: $m_{C4}=\rho\times V_{C4}=7.9\times 8.4=66$ kg

Required $CO_2$ volume: $V(CO_2)=84\times 90\%=75.6\ m^3$

Required $CO_2$ quality: $m_{CO_2}=\rho\times V_{CO_2}=7.9\times 75.6=598$ kg

The partial pressures of $C_4F_7N$ and $CO_2$ required:

Partial pressure of $C_4F_7N$: P1=0.06 MPa

Partial pressure of $CO_2$: P2=0.54 MPa

Traditional Dynamic Gas Preparation Method

The traditional dynamic gas preparation method uses mass flow meters to control the flow of $C_4F_7N$ and $CO_2$. The maximum gas preparation speed can reach 6 $m^3$/h. It takes at least 14 h to prepare 84 $m^3$ of $C_4F_7N/CO_2$ mixed gas.

Traditional Partial Pressure Method

Fill the equipment first with $C_4F_7N$ of 0.06 MPa, and then with $CO_2$ gas of 0.54 MPa. Due to the low accuracy of the pressure gauge used, there is a relatively great error. Generally, the proportion error of the gases in the mixed gas reaches 2%-3%; it takes a relatively short time to inflate the equipment, but it takes at least 24 h for the gas to be evenly mixed in the equipment.

Multifunctional Gas Preparation Method of the Present Disclosure

Since the flow through the solenoid valve is not limited by the gas type, the gas preparation speed of this method can reach 60 $m^3$/h, and the gas preparation work of the GIL gas chamber can be completed in less than 2 h. Since the mass/pressure dual measurement methods are adopted, the sensitivity is 1‰, which can meet the requirements of accurately monitoring the partial pressures of the two gases. Thus, the method has fast gas preparation speed and high precision.

In summary, the present disclosure greatly guarantees the stability of the state of the gas source input to the system and improves the gas preparation speed. That is to say, it can realize the two gas preparation modes of quantitative flow gas preparation and partial pressure gas preparation, and realize the versatility of the gas preparation of the present disclosure. According to different gas preparation purposes, different gas preparation pipeline structures can be switched. It can not only use the method of quantitative flow gas preparation to meet the needs of a tiny amount of $C_4F_7N/CO_2$ mixed gas in the laboratory, but also use the method of partial pressure preparation to quickly prepare a large amount of $C_4F_7N/CO_2$ mixed gas at different pressures. The present disclosure integrates two gas preparation pipeline structures into one overall pipeline structure, so that the gas preparation system of the present disclosure has a high equipment integration rate, and can effectively reduce the cost of the system, simplify the complexity of the control and improve the flexibility of preparation. The present disclosure can also meet the needs of gas supplementing, such as supplementing gas for leaking equipment, and accurately correcting the proportion of mixed gas in the equipment.

It should be noted that if there are relationship terms such as “first” and “second”, etc., they are only used to distinguish one entity or operation from another, and do not necessarily require or imply that there are any such actual relationships or orders between these entities or operations. Moreover, the terms “include”, “comprise” or any other variants thereof are intended to cover the meaning of non-exclusive inclusion, so that a process, method, article or device including a series of elements not only includes those elements, but further includes other elements that are not explicitly listed, or include elements inherent to this process, method, article or device. If there are no more restrictions, the elements defined by the sentence “including a . . . ” do not exclude the existence of other identical elements in the process, method, article or equipment that includes the elements.

The foregoing embodiments are only used to illustrate the technical solution of the present disclosure, but not to limit it. Although the present disclosure has been described in detail with reference to the foregoing embodiments, those of ordinary skill in the art should understand that they can still modify the technical solutions described in the foregoing embodiments or equivalently replace some of the technical features. These modifications or replacements, however, do not cause the essence of the corresponding technical solutions to deviate from the spirit and scope of the technical solutions of the embodiments of the present disclosure.

The invention claimed is:

1. A multifunctional $C_4F_7N/CO_2$ mixed gas preparation system, comprising a $C_4F_7N$ input port, a $CO_2$ input port, a $C_4F_7N$ heat exchanger, a $CO_2$ heat exchanger, a $C_4F_7N/CO_2$ mixing pipeline structure, and a $C_4F_7N/CO_2$ mixed gas output pipeline structure;

the $C_4F_7N$ heat exchanger is used to heat and vaporize $C_4F_7N$ input through the $C_4F_7N$ input port; the $CO_2$ heat exchanger is used to heat and vaporize $CO_2$ input through the $CO_2$ input port; the $C_4F_7N/CO_2$ mixing pipeline structure is used to mix heated $C_4F_7N$ and heated $CO_2$, and the $C_4F_7N/CO_2$ mixed gas output pipeline structure is used to output $C_4F_7N/CO_2$ mixed gas;

the $C_4F_7N/CO_2$ mixing pipeline structure comprises a $C_4F_7N/CO_2$ dynamic gas preparation pipeline structure and a $C_4F_7N/CO_2$ partial pressure mixing pipeline structure; and the $C_4F_7N/CO_2$ dynamic gas preparation pipeline structure and the $C_4F_7N/CO_2$ partial pressure mixing pipeline structure are arranged in parallel; wherein the $C_4F_7N/CO_2$ dynamic gas preparation pipeline structure is used to quantitatively mix the heated $CO_2$ and the heated $C_4F_7N$; and the $C_4F_7N/CO_2$ partial pressure mixing pipeline structure is used to mix the heated $CO_2$ and the heated $C_4F_7N$ at certain pressures;

wherein the $C_4F_7N/CO_2$ dynamic gas preparation pipeline structure comprises a first solenoid valve, a second solenoid valve, a first thermal mass flow meter, a second thermal mass flow meter, a buffer mixing tank, a first pipe, and a second pipe;

the buffer mixing tank is provided with a first gas inlet, a second gas inlet, and a first mixed gas outlet; and a gas outlet of the $CO_2$ heat exchanger is communicated with the first gas inlet through the first pipe, and the first solenoid valve and the first thermal mass flow meter are both arranged on the first pipe; a gas outlet of the $C_4F_7N$ heat exchanger is communicated with the second gas inlet through the second pipe, and the second solenoid valve and the second thermal mass flow meter are both arranged on the second pipe; and the first mixed gas outlet is communicated with an inlet end of the $C_4F_7N/CO_2$ mixed gas output pipeline structure;

wherein the $C_4F_7N/CO_2$ partial pressure mixing pipeline structure comprises a plurality of partial pressure mixing tanks each having a gas inlet, a third pipe, a fourth pipe, a fifth pipe, a third solenoid valve, a fourth solenoid valve, and a first proportional valve; the third solenoid valve and the fourth solenoid valve are not opened at the same time;

wherein the plurality of the partial pressure mixing tanks are arranged in parallel; a gas inlet of the third pipe is communicated with the $CO_2$ input port, a gas inlet of the fourth pipe is communicated with the $C_4F_7N$ input port, and a gas outlet of the third pipe and a gas outlet of the fourth pipe are both communicated with a gas inlet of the fifth pipe; a gas outlet of the fifth pipe is communicated with the gas inlets of the partial pressure mixing tanks; the third solenoid valve is arranged on the third pipe, the fourth solenoid valve is arranged on the fourth pipe, and the first proportional valve is arranged on the fifth pipe;

wherein a differential pressure sensor is provided on each of the partial pressure mixing tanks to monitor online a pressure of a gas in the partial pressure mixing tanks; a weight sensor is provided at a bottom of each of the partial pressure mixing tanks to monitor online a weight of the gas in the partial pressure mixing tanks; wherein an accuracy of $C_4F_7N$ and $CO_2$ gas preparation is monitored by the pressure of the gas and the weight of the gas.

2. The multifunctional $C_4F_7N/CO_2$ mixed gas preparation system of claim 1, wherein the plurality of partial pressure mixing tanks comprise a first partial pressure mixing tank and a second partial pressure mixing tank; a circulating mixing pipeline structure is provided in communication with both the first and the second partial pressure mixing tanks; the circulating mixing pipeline structure comprises two fifth solenoid valves, a first air pump, a first one-way valve, two sixth solenoid valves, and a circulating pipe; two ends of each of the first and the second partial pressure mixing tanks are respectively provided with a circulating gas inlet and a circulating gas outlet;

the circulating pipe comprises a first circulating gas inlet section, a second circulating gas inlet section, a circulating section, a first circulating gas outlet section and a second circulating gas outlet section;

a gas inlet of the first circulating gas inlet section is communicated with the circulating gas outlet of the first partial pressure mixing tank, a gas inlet of the second circulating gas inlet section is communicated with the circulating gas outlet of the second partial pressure mixing tank; the two fifth solenoid valves are respectively arranged on the first and the second circulating gas inlet sections;

a gas outlet of the first circulating gas inlet section and a gas outlet of the second circulating gas inlet section are both communicated with a gas inlet of the circulating section;

the first air pump and the first one-way valve are all provided on the circulating section;

a gas outlet of the circulating section is communicated with a gas inlet of the first circulating gas outlet section and a gas inlet of the second circulating gas outlet section; the two sixth solenoid valves are respectively provided on the first and the second circulating gas outlet sections;

a gas outlet of the first circulating gas outlet section is communicated with the circulating gas inlet of the first partial pressure mixing tank, and a gas outlet of the second circulating gas outlet section is communicated with the circulating gas inlet of the second partial pressure mixing tank.

3. The multifunctional $C_4F_7N/CO_2$ mixed gas preparation system of claim 2, wherein the $C_4F_7N/CO_2$ mixing pipeline structure further comprises an output pipeline structure for extracting the $C_4F_7N/CO_2$ mixed gas in the first and the second partial pressure mixing tanks;

the output pipeline structure comprises a seventh solenoid valve, an oil-free vacuum pump or a negative pressure pump, a second one-way valve, a second proportional valve, an eighth solenoid valve, a first output pipe, and a second output pipe;

the first output pipe and the second output pipe are arranged in parallel, a gas inlet of the first output pipe is communicated with two gas outlets of the first and the second partial pressure mixing tanks, a gas inlet of the second output pipe is communicated with the two gas outlets of the first and the second partial pressure mixing tanks, and a gas outlet of the first output pipe and a gas outlet of the second output pipe are both communicated with the $C_4F_7N/CO_2$ mixed gas output pipeline structure;

the seventh solenoid valve, the oil-free vacuum pump or the negative pressure pump, and the second one-way valve are sequentially arranged on the first output pipe along a gas conveying direction; and the second proportional valve and the eighth solenoid valve are sequentially arranged on the second output pipe along a gas flow direction.

4. The multifunctional $C_4F_7N/CO_2$ mixed gas preparation system of claim 3, further comprising a pressurizing pipeline structure for pressurizing the $C_4F_7N/CO_2$ mixed gas output from the $C_4F_7N/CO_2$ mixing pipeline structure.

5. The multifunctional $C_4F_7N/CO_2$ mixed gas preparation system of claim 4, wherein the pressurizing pipeline structure comprises a first buffer tank, a second air pump, a third one-way valve, a first pressurizing pipe, a second pressurizing pipe, a third proportional valve, and a third pressurizing pipe; wherein the first, second, and third pressurizing pipes each have two ends;

both ends of the first pressurizing pipe are respectively communicated with an outlet end of the $C_4F_7N/CO_2$ dynamic gas preparation pipeline structure and a first gas inlet of the first buffer tank;

both ends of the second pressurizing pipe are respectively communicated with an outlet end of the $C_4F_7N/CO_2$ partial pressure mixing pipeline structure and a second gas inlet of the first buffer tank;

both ends of the third pressurizing pipe are respectively communicated with a gas outlet of the first buffer tank and the inlet end of the $C_4F_7N/CO_2$ mixed gas output pipeline structure;

the third proportional valve is arranged on the first pressurizing pipe, and the second air pump and the third one-way valve are arranged on the third pressurizing pipeline sequentially along the gas flow direction.

6. The multifunctional $C_4F_7N/CO_2$ mixed gas preparation system of claim 5, wherein the $C_4F_7N/CO_2$ mixed gas output pipeline structure comprises a ninth solenoid valve, a second buffer tank, and a mixed gas outlet pipe; a gas inlet of the mixed gas outlet pipe is communicated with an outlet end of the pressurizing pipeline structure; and the ninth solenoid valve and the second buffer tank are sequentially arranged on the mixed gas outlet pipe along a gas flow direction.

7. A $C_4F_7N/CO_2$ mixed gas preparation method using the multifunctional $C_4F_7N/CO_2$ mixed gas preparation system of claim 1, comprising the following steps:

S1, performing vacuum treatment to the gas preparation system;

S2, heating and vaporizing the $C_4F_7N$ input through the $C_4F_7N$ input port by the $C_4F_7N$ heat exchanger; and heating and vaporizing the $CO_2$ input through the $CO_2$ input port by the $CO_2$ heat exchanger;

S3, mixing the heated $C_4F_7N$ and $CO_2$ in the $C_4F_7N/CO_2$ mixing pipeline structure;

wherein the heated $C_4F_7N$ and $CO_2$ are quantitatively mixed through a $C_4F_7N/CO_2$ dynamic mixing pipeline structure; the heated $C_4F_7N$ and $CO_2$ are mixed at certain pressures through the $C_4F_7N/CO_2$ partial pressure mixing pipeline structure; the plurality of the partial pressure mixing tanks alternately perform gas preparation and output; and S4, outputting the $C_4F_7N/CO_2$ mixed gas through the $C_4F_7N/CO_2$ mixed gas output pipeline structure.

8. A $C_4F_7N/CO_2$ mixed gas preparation method using the multifunctional $C_4F_7N/CO_2$ mixed gas preparation system of claim 2, comprising the following steps:

S1, performing vacuum treatment to the gas preparation system;

S2, heating and vaporizing the $C_4F_7N$ input through the $C_4F_7N$ input port by the $C_4F_7N$ heat exchanger; and heating and vaporizing the $CO_2$ input through the $CO_2$ input port by the $CO_2$ heat exchanger;

S3, mixing the heated $C_4F_7N$ and $CO_2$ in the $C_4F_7N/CO_2$ mixing pipeline structure;

wherein the heated $C_4F_7N$ and $CO_2$ are quantitatively mixed through a $C_4F_7N/CO_2$ dynamic mixing pipeline structure; the heated $C_4F_7N$ and $CO_2$ are mixed at certain pressures through the $C_4F_7N/CO_2$ partial pressure mixing pipeline structure; wherein the first and the second partial pressure mixing tanks alternately perform gas preparation and output; and S4, outputting the $C_4F_7N/CO_2$ mixed gas through the $C_4F_7N/CO_2$ mixed gas output pipeline structure.

9. A $C_4F_7N/CO_2$ mixed gas preparation method using the multifunctional $C_4F_7N/CO_2$ mixed gas preparation system of claim 3, comprising the following steps:

S1, performing vacuum treatment to the gas preparation system;

S2, heating and vaporizing the $C_4F_7N$ input through the $C_4F_7N$ input port by the $C_4F_7N$ heat exchanger; and heating and vaporizing the $CO_2$ input through the $CO_2$ input port by the $CO_2$ heat exchanger;

S3, mixing the heated $C_4F_7N$ and $CO_2$ in the $C_4F_7N/CO_2$ mixing pipeline structure;

wherein the heated $C_4F_7N$ and $CO_2$ are quantitatively mixed through a $C_4F_7N/CO_2$ dynamic mixing pipeline structure; the heated $C_4F_7N$ and $CO_2$ are mixed at certain pressures through the $C_4F_7N/CO_2$ partial pressure mixing pipeline structure; wherein the first and the second partial pressure mixing tanks alternately perform gas preparation and output; and S4, outputting the $C_4F_7N/CO_2$ mixed gas through the $C_4F_7N/CO_2$ mixed gas output pipeline structure.

10. A $C_4F_7N/CO_2$ mixed gas preparation method using the multifunctional $C_4F_7N/CO_2$ mixed gas preparation system of claim 4, comprising the following steps:

S1, performing vacuum treatment to the gas preparation system;

S2, heating and vaporizing the $C_4F_7N$ input through the $C_4F_7N$ input port by the $C_4F_7N$ heat exchanger; and heating and vaporizing the $CO_2$ input through the $CO_2$ input port by the $CO_2$ heat exchanger;

S3, mixing the heated $C_4F_7N$ and $CO_2$ in the $C_4F_7N/CO_2$ mixing pipeline structure;

wherein the heated $C_4F_7N$ and $CO_2$ are quantitatively mixed through a $C_4F_7N/CO_2$ dynamic mixing pipeline structure; the heated $C_4F_7N$ and $CO_2$ are mixed at certain pressures through the $C_4F_7N/CO_2$ partial pressure mixing pipeline structure; wherein the first and the second partial pressure mixing tanks alternately perform gas preparation and output; and S4, outputting the $C_4F_7N/CO_2$ mixed gas through the $C_4F_7N/CO_2$ mixed gas output pipeline structure.

11. A $C_4F_7N/CO_2$ mixed gas preparation method using the multifunctional $C_4F_7N/CO_2$ mixed gas preparation system of claim 5, comprising the following steps:

S1, performing vacuum treatment to the gas preparation system;

S2, heating and vaporizing the $C_4F_7N$ input through the $C_4F_7N$ input port by the $C_4F_7N$ heat exchanger; and heating and vaporizing the $CO_2$ input through the $CO_2$ input port by the $CO_2$ heat exchanger;

S3, mixing the heated $C_4F_7N$ and $CO_2$ in the $C_4F_7N/CO_2$ mixing pipeline structure;

wherein the heated $C_4F_7N$ and $CO_2$ are quantitatively mixed through a $C_4F_7N/CO_2$ dynamic mixing pipeline structure; the heated $C_4F_7N$ and $CO_2$ are mixed at certain pressures through the $C_4F_7N/CO_2$ partial pressure mixing pipeline structure; wherein the first and the second partial pressure mixing tanks alternately perform gas preparation and output; and S4, outputting the $C_4F_7N/CO_2$ mixed gas through the $C_4F_7N/CO_2$ mixed gas output pipeline structure.

12. A $C_4F_7N/CO_2$ mixed gas preparation method using the multifunctional $C_4F_7N/CO_2$ mixed gas preparation system of claim 6, comprising the following steps:

S1, performing vacuum treatment to the gas preparation system;

S2, heating and vaporizing the $C_4F_7N$ input through the $C_4F_7N$ input port by the $C_4F_7N$ heat exchanger; and heating and vaporizing the $CO_2$ input through the $CO_2$ input port by the $CO_2$ heat exchanger;

S3, mixing the heated $C_4F_7N$ and $CO_2$ in the $C_4F_7N/CO_2$ mixing pipeline structure;

wherein the heated $C_4F_7N$ and $CO_2$ are quantitatively mixed through a $C_4F_7N/CO_2$ dynamic mixing pipeline structure; the heated $C_4F_7N$ and $CO_2$ are mixed at certain pressures through the $C_4F_7N/CO_2$ partial pressure mixing pipeline structure; wherein the first and the second partial pressure mixing tanks alternately perform gas preparation and output; and S4, outputting the $C_4F_7N/CO_2$ mixed gas through the $C_4F_7N/CO_2$ mixed gas output pipeline structure.

* * * * *